United States Patent [19]

Oketa et al.

[11] Patent Number: 5,956,452
[45] Date of Patent: Sep. 21, 1999

[54] STILL PICTURE RECORDING AND REPRODUCING APPARATUS WHICH PROPERLY PERFORMS RECORDING AND REPRODUCING A PLURALITY OF DIFFERENT RECORDING FORMATS

[75] Inventors: Kosei Oketa; Toshinari Kawahara; Aki Nakamura, all of Kyoto, Japan

[73] Assignee: Mitsubishi Denki Kabushiki Kaisha, Tokyo, Japan

[21] Appl. No.: 08/763,788

[22] Filed: Dec. 11, 1996

Related U.S. Application Data

[63] Continuation of application No. 08/135,550, Oct. 14, 1993, abandoned.

[30] Foreign Application Priority Data

| Oct. 19, 1992 | [JP] | Japan | 4-304506 |
| Oct. 19, 1992 | [JP] | Japan | 4-304507 |
| Apr. 6, 1993 | [JP] | Japan | 5-101823 |

[51] Int. Cl.$^6$ ............................................. H04N 5/76
[52] U.S. Cl. ................... 386/1; 386/21; 386/46; 386/113; 386/121
[58] Field of Search ................. 386/1, 4, 33, 45, 386/38, 21, 46, 52, 63–64, 108, 117, 121, 125, 126, 113; 360/18, 27, 69; 369/47–48, 54; H04N 5/76, 5/92, 5/78, 9/79

[56] References Cited

U.S. PATENT DOCUMENTS

| 4,849,817 | 7/1989 | Short | 358/311 |
| 4,959,735 | 9/1990 | Kawai | 358/906 |
| 4,974,111 | 11/1990 | Platte et al. | 358/311 |
| 4,982,291 | 1/1991 | Kurahashi et al. | 358/906 |
| 5,418,926 | 5/1995 | Horii et al. | 358/906 |

FOREIGN PATENT DOCUMENTS

| 62-276977 | 12/1987 | Japan . |
| A2220580 | 2/1990 | Japan . |
| 2159191 | 6/1990 | Japan . |
| 4-137868 | 5/1992 | Japan . |

*Primary Examiner*—Thai Tran

[57] ABSTRACT

In a still picture recording and reproducing apparatus, image data are recorded from a communication frame memory directly to a recording medium, thereby editing is carried out and reproduced data, title or the like is stored in a memory. The title is varied by a microcomputer and recorded directly in the recording medium to achieve editing. The still picture recording and reproducing apparatus has a signal changing circuit, a synchro detection circuit, a record format selection circuit, a recording apparatus, a display circuit, and a microcomputer to control these circuits. Recording capacity per one image is set in response to recording format, and the number of residual recordable sheets is displayed. At no-input state, recording is forbidden and this state is displayed. Also the recording format is recorded and at reproducing state, the recording format is detected and the circuit is changed by the signal changing circuit. Further, plural different clocks to obtain data rate of low speed and high speed are generated from data rate of image display by a clock generating circuit. At dubbing, one clock is selected among the plural different clocks by a clock selector circuit. By a control circuit and an interface circuit, data transfer is carried out at a data rate based on the selected clock.

7 Claims, 23 Drawing Sheets

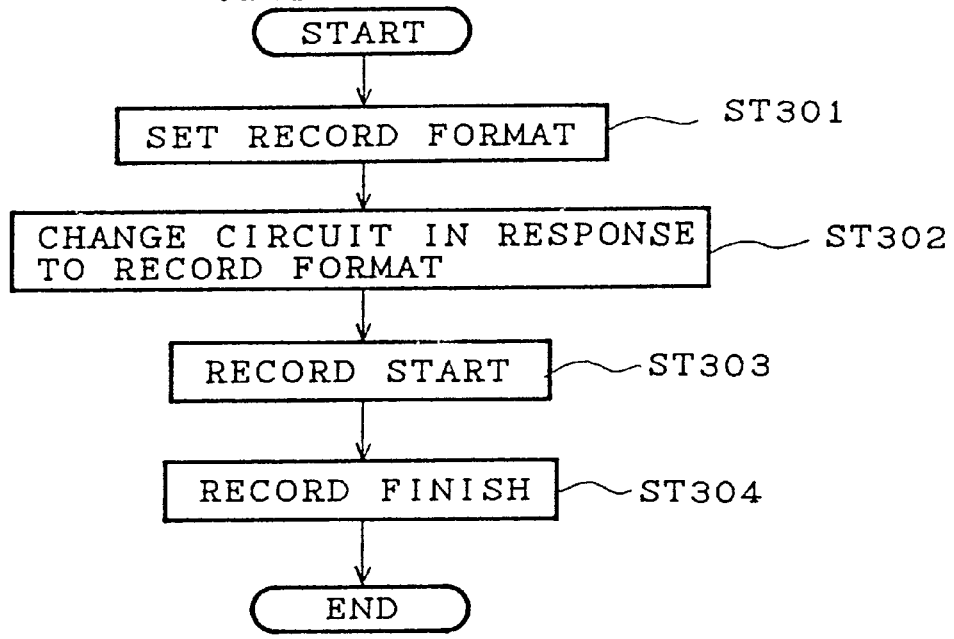
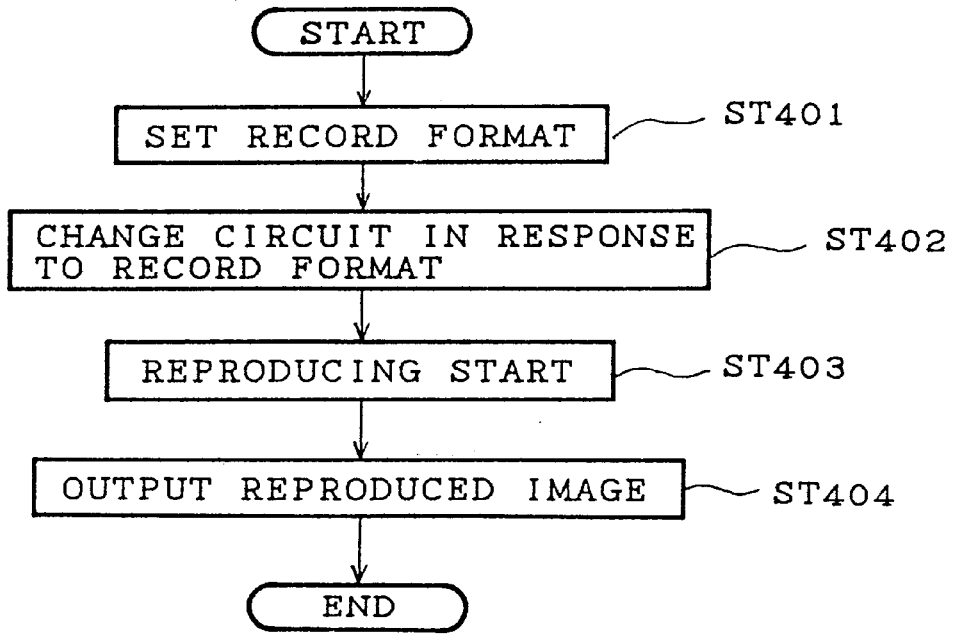

DATA IN/OUT
(DESTINATION APPARATUS)

STILL PICTURE RECORDING AND REPRODUCING APPARATUS WHICH PROPERLY PERFORMS RECORDING AND REPRODUCING A PLURALITY OF DIFFERENT RECORDING FORMATS

This application is a continuation of application Ser. No. 08/135,550 filed on Oct. 14, 1993, now abandoned.

BACKGROUND OF THE INVENTION

1. Field of the Invention

The present invention relates to a still picture recording and reproducing apparatus having an edit function and capable of recording a still picture of a plurality of record formats.

2. Description of the Prior Art

FIG. 1 is a block diagram showing an example of a still picture recording and reproducing apparatus having an edit function in the prior art. In FIG. 1, A, B designate two still picture recording and reproducing apparatuses used for editing respectively, numeral 101 designates a recording and reproducing apparatus containing a record medium for performing recording and reproducing, numeral 109 designates a frame memory for image display, numeral 107 designates a D/A converter for converting data read out from the frame memory 109 for image display into analog data, and numeral 108 designates a frame memory for communication with the frame memory 109 for image display.

In the following description, the still picture recording and reproducing apparatus A, B will be simply called apparatus A and apparatus B.

In the prior art, editing of a still picture has been carried out using two or more still picture recording and reproducing apparatuses. Here, operation in the case of editing a still picture of the apparatus A by the apparatus B will be explained. First, data recorded in the record medium of the recording and reproducing apparatus 101 of the apparatus A are reproduced. The data are written in the frame memory 108 for communication of the apparatus A in synchronization with the reproducing clock. After finishing writing, the data are read out from the frame memory 108 for communication in synchronization with the clock for image display and written in the frame memory 109 for image display of the apparatus A. After finishing the data transfer, the data pass through the D/A converter 107 of the apparatus A and are outputted as analog signal and displayed as an image. Here, when the displayed image is not recorded in the recording medium of apparatus B, apparatus A continues to reproduce according to the above-mentioned procedure until the image desired to be recorded appears.

When the still picture displayed in apparatus A is to be recorded in the recording medium of apparatus B, data of the frame memory 108 for communication by apparatus A are read out in synchronization with clock in recording operation to the recording medium of apparatus B and are recorded in the recording medium of apparatus B. Thus editing becomes possible in that any still picture is selected from the recording medium of apparatus A and recorded in the recording medium of apparatus B.

When the still picture is edited using the still picture recording and reproducing apparatus in the prior art in this manner, the two similar apparatuses A and B are required and moreover the operability is poor.

Also in the prior art, since characters such as date, title or the like is superimposed on the image and recorded as a part of the image to the recording medium, it is difficult for the character once recorded to be subsequently changed.

FIG. 2 is a block diagram showing a still picture recording and reproducing apparatus in the prior art. In FIG. 2, numeral 201 designates a comb filter for carrying out Y-C separation of a composite signal, numeral 202 designates a decoder for producing color difference signals of R-Y, B-Y from the signals of Y, C, numeral 203 designates a signal changing circuit for selecting one recording format among Y, R-Y, B-Y signals produced from a monochromatic signal and a composite signal as well as RGB signals, numeral 214 designates an A/D converter for converting an input signal selected in the signal changing circuit 203 from analog into digital, numeral 212 designates a frame memory for storing a signal subjected to digital conversion, numeral 210 designates a recording and reproducing apparatus that data, read out from the frame memory 212 are recorded and reproduced in a recording medium such as a magnetic tape, numeral 213 designates a frame memory for storing a reproducing signal of the recording and reproducing apparatus 210, and numeral 215 designates a D/A converter for converting data read out from the frame memory 213 into analog data.

Numeral 205 designates a signal changing circuit for selecting in which record formatting among a monochromatic signal, and a color difference signal, RGB signals should be used for data sent from the D/A converter and for sending the data to the next stage, numeral 206 designates an encoder for producing a composite signal from color difference signals of Y, R-Y, B-Y selected in the signal changing circuit 205, numeral 207 designates a signal changing circuit for selecting one among composite and monochromatic input signals and a reproduced monochromatic signal and a reproduced composite signal and for outputting the selected signal, numeral 208 designates a signal changing circuit for selecting one among the RGB input signals and the reproduced RGB signals and for outputting the selected signal, numeral 211 designates a recording format selecting circuit, and numeral 209 designates a microcomputer for reading information of a selected recording format and for controlling and changing the signal changing circuits 203, 205, 207, 208 in response to the information.

FIG. 3 is a flow chart showing operation in a recording state, and FIG. 4 is a flow chart showing operation in a reproducing state.

First, operation in a recording state will be described referring to FIGS. 2 and 3. In step ST301, information of a recording format selected by a switch within the recording format selecting circuit 211 is sent to the microcomputer 209, and in response to the information, the signal changing circuit 203 is changed in step ST302. If recording is started in step ST303, when the input signal is a monochromatic signal, the input signal is written through the signal changing circuit 203 and the A/D converter 214 into the frame memory 212, and after finishing the writing, the data are read out and recorded in a tape by the recording and reproducing apparatus 210. When the input signal is a composite signal, the input signal is written through the comb filter 201, the decoder 202, the signal changing circuit 203 and the A/D converter 214 into the frame memory 212 and then the data are recorded on a tape in similar operation to that of the monochromatic signal as above described. When the input signal is of RGB type, the input signal is written through the signal changing circuit 203 and the A/D converter 214 into the frame memory 212 and then the data are recorded in a tape in similar operation to that of the composite signal. When image data of a still picture are recorded, if the number of sheets of the image capable of being recorded in one record medium is made constant, as this is convenient for use and the control becomes easy, the record capacity per each image is made constant. In step ST304, the recording is finished. During the recording operation, the input signal is output exactly and monitored by the signal changing circuits 207, 208.

Next, operation in the reproducing state will be described referring to FIGS. 2 and 4. First, before reproducing, in step ST401, a switch within the recording format selecting circuit 211 is set by a user in order to indicate the recording format in the recorded tape. The information is sent to the microcomputer 209 in step ST402, and in response to the information, the signal changing circuits 205, 207, 208 are changed. If reproducing is started in step ST403, data are reproduced from the recording and reproducing apparatus 210 and the reproduced data are output in step ST404.

In the case of a monochromatic signal, data reproduced from the recording and reproducing apparatus 210 are written in the frame memory 213, and after finishing the writing, the data are read out from the frame memory 213 and subjected to analog conversion by the D/A converter 215 and output through the signal changing circuits 205, 207. When the record format is a composite signal format, operation to the D/A converter 215 is similar to that in the case of the monochromatic signal as above described, and then data pass through the signal changing circuit 205 and a color difference signal is encoded to a composite signal by the encoder 206 and output through the signal changing circuit 207. When the record format is RGB signal format, operation to the signal changing circuit 205 is similar to that in the case of the monochromatic signal and the composite signal as above described, and then data are output through the signal changing circuit 208.

In general, the image data amount is significantly different in monochromatic, composite, RGB signals respectively. In the prior art, however, since the function of individually setting recording capacity per one picture plane in response to the recording format is not provided, the recording capacity must be fitted to the maximum image data amount in the recording format and therefore the record medium cannot be utilized effectively. Since the recording operation is carried out also in the case of the input signal, erroneous recording may occur. For example, when a signal is input to RGB to RGB signals and the recording format is set to a composite signal format, since the composite input has no signal, if the recording is carried out, the recording in composite having no signal will be carried out. Since an input signal appears intact at the output during the recording, even if only output of each signal is seen, the setting mistake of the recording format is not noticed, and the erroneous recording is not noticed before reproducing. During reproducing, since the setting of the recording format must be varied in response to the recording medium, the work is troublesome and if the setting mistake occurs, an abnormal image will be output. For example, if data of color difference with a composite signal decoded are output as RGB signals, the color will become quite abnormal.

FIG. 5 is a block diagram showing an example of a still picture dubbing apparatus in the prior art. In FIG. 5, numeral 561 designates an A/D converter for converting data of the green image (still picture or movie picture) from analog into digital, numerals 562, 563 designate A/D converters for red, blue respectively, numeral 564 designates a D/A converter for converting data of the green image from digital into analog, numerals 565, 566 designate D/A converters for red, blue respectively, numeral 567 designates a frame memory for exclusive display of still picture in green, numerals 568, 569 designate frame memories for display of red and blue still pictures and movie pictures respectively, numeral 570 designates a frame memory for communication between the frame memory 567 and a recording apparatus 585 described later, numerals 571, 572 designate frame memories for communication between the frame memories 568, 569 and the recording apparatus 585 respectively, numeral 587 designates a three-state input buffer for buffering green image data during dubbing, and numerals 589, 591 designate three-state input buffers for buffering red and blue image data respectively during dubbing.

Numeral 588 designates a three-state output buffer for buffering green image data during dubbing, numerals 590, 592 designate three-state output buffers for buffering red and blue image data respectively during dubbing, numeral 580 designates a three-state buffer which is enabled when image data are written from the recording apparatus 585 into the frame memory 570, numeral 582 designates a three-state buffer which is enabled when image data are written into the frame memory 571, and numeral 584 designates a three-state buffer becoming enable when image data are written into the frame memory 572 respectively. Numeral 573 designates a three-state buffer which is enabled when image data are written from the frame memory 570 into the frame memory 567, numeral 575 designates a three-state buffer which is enabled when image data are written from the frame memory 571 into the frame memory 568, and numeral 577 designates a three-state buffer which is enabled when image data are written from the frame memory 572 into the frame memory 569 respectively. Numeral 585 designates a recording apparatus for recording images.

Data Transmission During Dubbing

In FIG. 5, image data recorded in the recording apparatus 585 are reproduced in the order of green, red, blue, and pass through three-state buffers 580, 582, 584 respectively, and are stored in the frame memories 570, 571, 572 in synchronization with a read clock of the recording apparatus 585. Afterwards image data stored respectively in the frame memories 570, 571, 572 are read out, and pass through the three-state buffers 573, 575, 577 and are transferred to the frame memories for image display 567, 568, 569 in synchronization with image display clock. Image data stored respectively in the frame memories 567, 568, 569 are read out and converted into analog data by the D/A converters 564, 565, 566. Thus color images are reproduced and displayed in a display apparatus (not shown) connected to these D/A converters.

Here, the same data as the image data for image display transferred from the frame memories 567, 568, 569 to the D/A converters 564, 565, 566, pass through three-state buffers 588, 590, 592 and are transmitted for dubbing to a destination apparatus (not shown).

Then outputs of the three-state buffers 579, 581, 583; 574, 576, 578; 587, 589, 591 have high impedance.

Data Reception During Dubbing

During reception, first, image data for dubbing are sent from the destination apparatus, and the green image data pass through the three-state buffer 587, the red image data pass through the three-state buffer 589, the blue image data pass through the three-state buffer 591 respectively, and then the image data are stored in the frame memories 567, 568, 569 respectively. The image data stored respectively in the frame memories 567, 568, 569 are read out, and then pass through the three-state buffers 574, 576, 578 respectively and are transferred to the frame memories 570, 571, 572 in synchronization with image display clock. Afterwards image data stored respectively in the frame memories 570, 571, 572 are read out, and then pass through the three-state buffers 579, 581, 583 and are sent to the recording apparatus 585. The recording apparatus 585 takes image data from the three-state buffers 579, 581, 583 in synchronization with write clock of the recording apparatus 585 and records the color images in the record medium. Then outputs of the three-state buffers 588, 590, 592; 593, 575, 577; 580, 582, 584 have high impedance.

As similar technology, JPA No. 159191/1990 discloses technology that video signals are stored in a semiconductor memory, and the stored video data are transferred through a system bus. Also JPA No. 220580/1990 discloses technology that in a storing and reproducing apparatus of still picture, data are stored in two data rates and then read out in two data rates.

In a still picture dubbing apparatus in the prior art, a data rate (transfer speed) during dubbing is the same as that of image display and therefore becomes very high speed. At present, sampling clock of image display of composite and RGB is about 15 MHz, and at speed in response to this clock, data are transferred also at high speed. As a result, since the influence to of crosstalk of other signal lines, unnecessary radiation, timing relation between data and clock, attenuation of signal respectively is large, this must be considered.

Also since transmission and reception are carried out using data for image display, horizontal synchronous signal and vertical synchronous signal are transmitted and received at the same data rate as that of image display. Since horizontal synchronous signal and vertical synchronous signal are always the same in any image, dubbing is not necessary. Further at image display interval other than horizontal and vertical synchronous signals, in general, several regions at both ends of the screen actually displayed are not used.

Also in dubbing, many dubbing terminals are required, in order that data of each image of RGB are simultaneously transmitted and received. Thereby various problems occur in that the connector for dubbing becomes large, and the space efficiency is deteriorated or convenience of use is poor. Also a dubbing operation due to connection failure or no connection of the connector cable accompanying with this may cause a problem that erroneous recording occurs frequently.

SUMMARY OF THE INVENTION

The present invention solves the above-mentioned problems.

Accordingly, a first object of the present invention is to improve operability of editing of a still picture image.

A second object of the present invention is to utilize a recording medium effectively.

A third object of the present invention is to decrease unnecessary radiation during dubbing.

A fourth object of the present invention is to enable dubbing of a still picture at high speed.

To achieve these objects, still picture signals reproduced from a recording medium are stored in storage means, and still picture signals are recorded and reproduced in the recording medium and the still picture signals read out from the storage means are recorded in assigned location of the recording medium. Consequently, editing of a still picture becomes possible in one apparatus, and workability during editing is improved.

Also a recording format is set, thereby record capacity per one image is determined in response to the format.

Further during dubbing, since a clock to obtain data rate of low speed and high speed is selected from a data rate of image display and data transfer is carried out, the data rate during dubbing can be set freely in response to the intended purpose. Consequently, when the data rate is made slower than the data rate of image display, influence due to crosstalk of other signal lines, unnecessary radiation, supervision of timing between data and clock signals, attenuation of signal becomes little. Also the data rate is increased, thereby permitting a large quantity of data to be transferred in a short time.

BRIEF DESCRIPTION OF THE DRAWINGS

FIG. 3 is a flow chart showing operation during recording of the still picture recording and reproducing apparatus in the prior art shown in FIG. 2;

FIG. 4 is a flow chart showing operation during reproducing of the still picture recording and reproducing apparatus in the prior art shown in FIG. 2;

DETAILED DESCRIPTION OF THE PREFERRED EMBODIMENTS

Embodiments of the the present invention will be described in detail referring to the accompanying drawings as follows.

Embodiment 1

Figure 6:
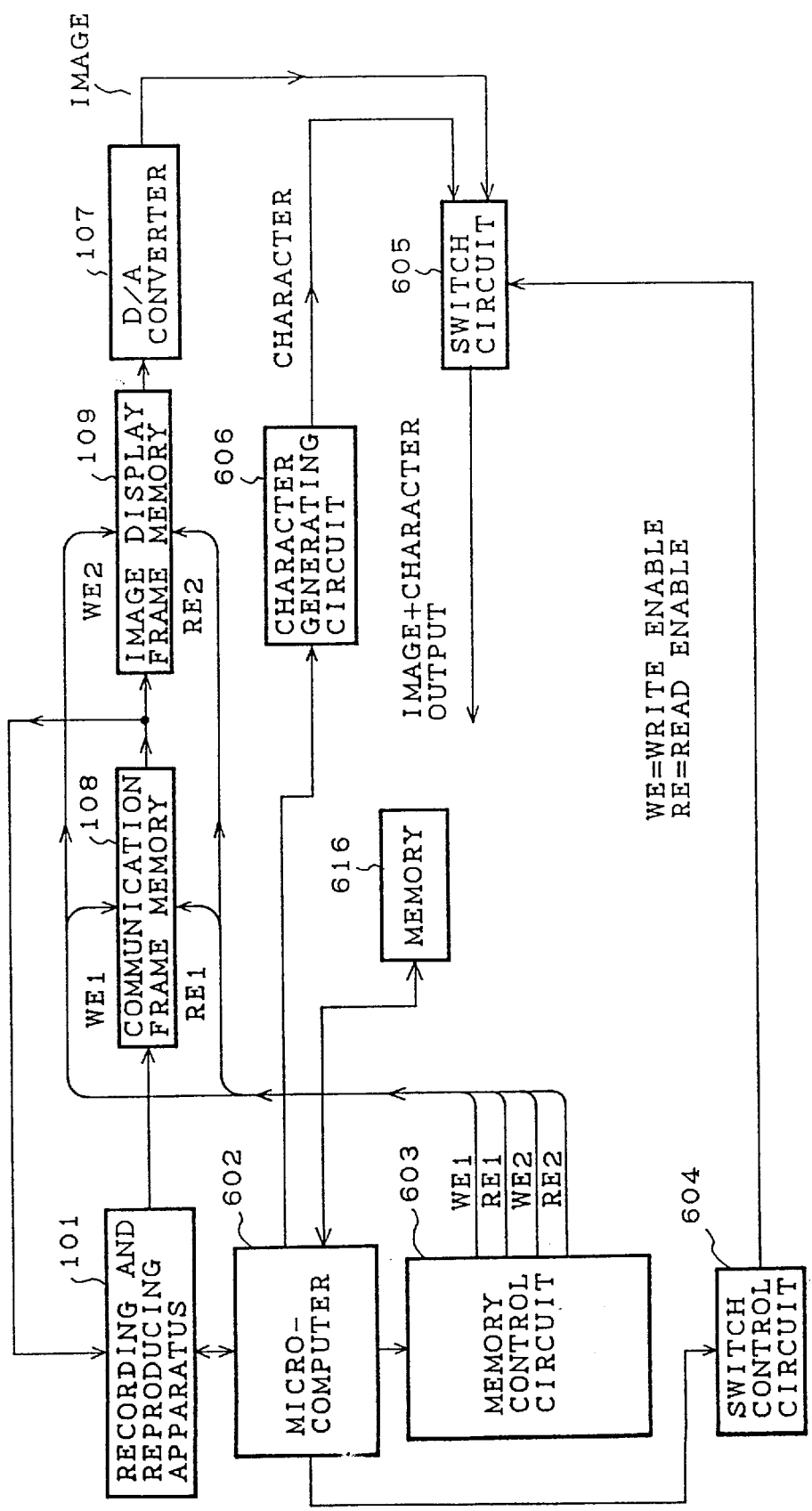
FIG. 6 is a block diagram showing a still picture recording and reproducing apparatus according to a first embodiment of the invention.

In FIG. 6, numerals 101, 108, 109, 107 correspond to parts designated by the same numerals in previous figures and the description shall be omitted.

In FIG. 6, numeral 602 designates a microcomputer for controlling the apparatus and varying date data and title data, numeral 603 designates a memory control circuit for supplying each of frame memories 108, 109 with write/read signals WE1, WE2, RE1, RE2, numeral 606 designates a character generating circuit for generating character data such as date or title, numeral 605 designates a switch circuit for exchanging and selecting and synthesizing image data from a D/A converter 107 and the above-mentioned character data, numeral 604 designates a switch control circuit for controlling the switch circuit 605, and numeral 616 designates a memory for storing character data such as date or title.

Figure 7:
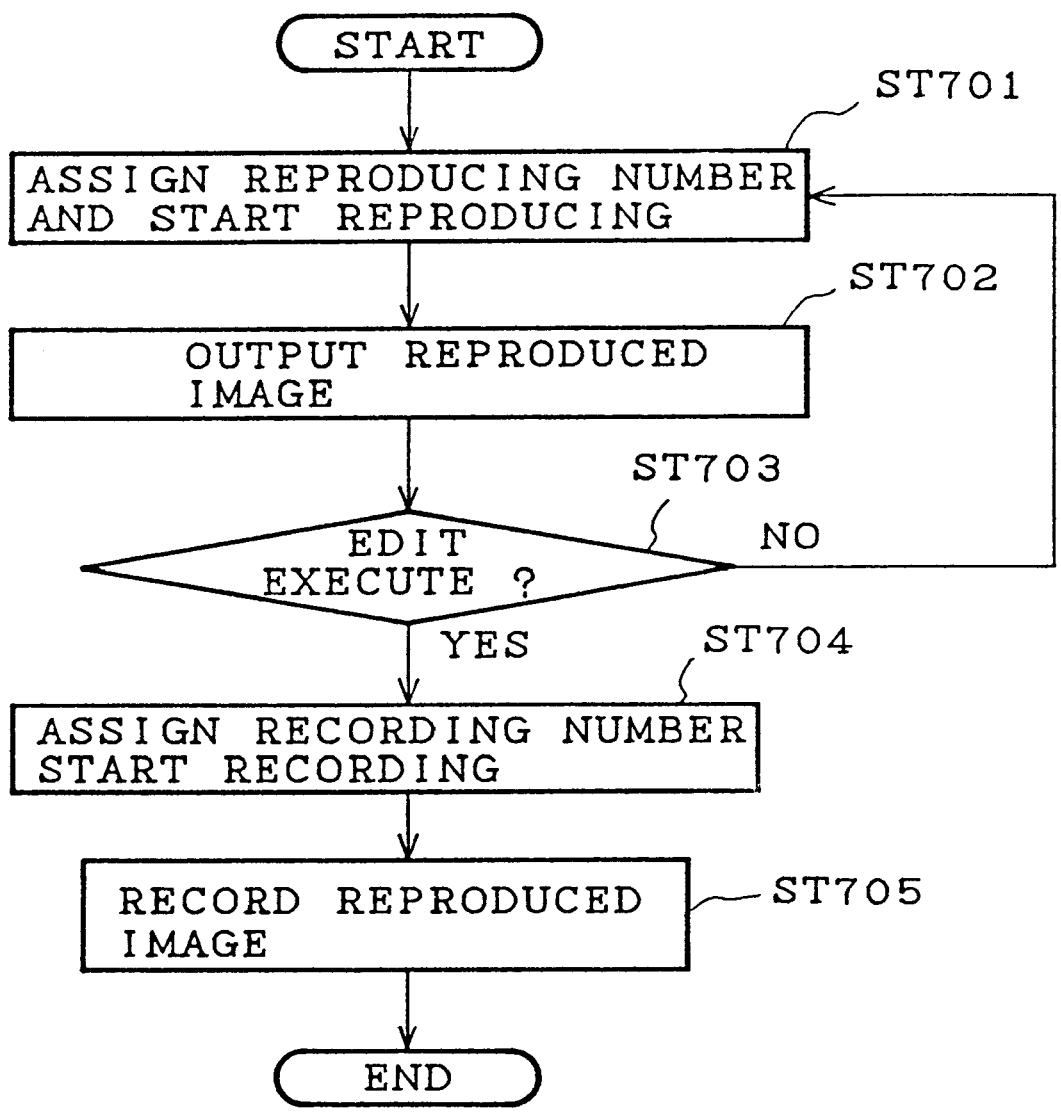
FIG. 7 is a flow chart showing operation of image editing of the still picture recording and reproducing apparatus according to the embodiment shown in FIG. 6.

FIG. 7 is a flow chart of operation when editing is carried out. In this embodiment, a plurality of still picture images recorded in a recording medium are controlled by the number and edited in assigning the number. First in step ST701, the number of a still picture image to be reproduced is assigned and reproducing is started. In step ST702, data recorded in the recording medium by a recording and reproducing apparatus 101 are reproduced, and data are written in a frame memory 108 for communication by the reproducing clock, and after the writing is finished, data are read out from the frame memory 108 for communication in image display clock and written in the frame memory 109 for image display. After the data transfer is finished, data are output as analog signals through the D/A converter 107 and image display is carried out.

In step ST703, when editing is not carried out to recording a display image to the record medium again, reproducing of different images in sequence by the above-mentioned procedure is repeated until an image desirable to be recorded is output. When the displayed still picture image is recorded to position of other image number, in step ST704, the image number desirable to be recorded on the recording medium is assigned and recording is started. In step ST705, since data of still picture image displayed at present are stored in the frame memory 108 for communication, the data of the frame memory 108 for communication are read out and recorded at position of the assigned image number of the record medium in write clock of the recording and reproducing apparatus 101.

Figure 8:
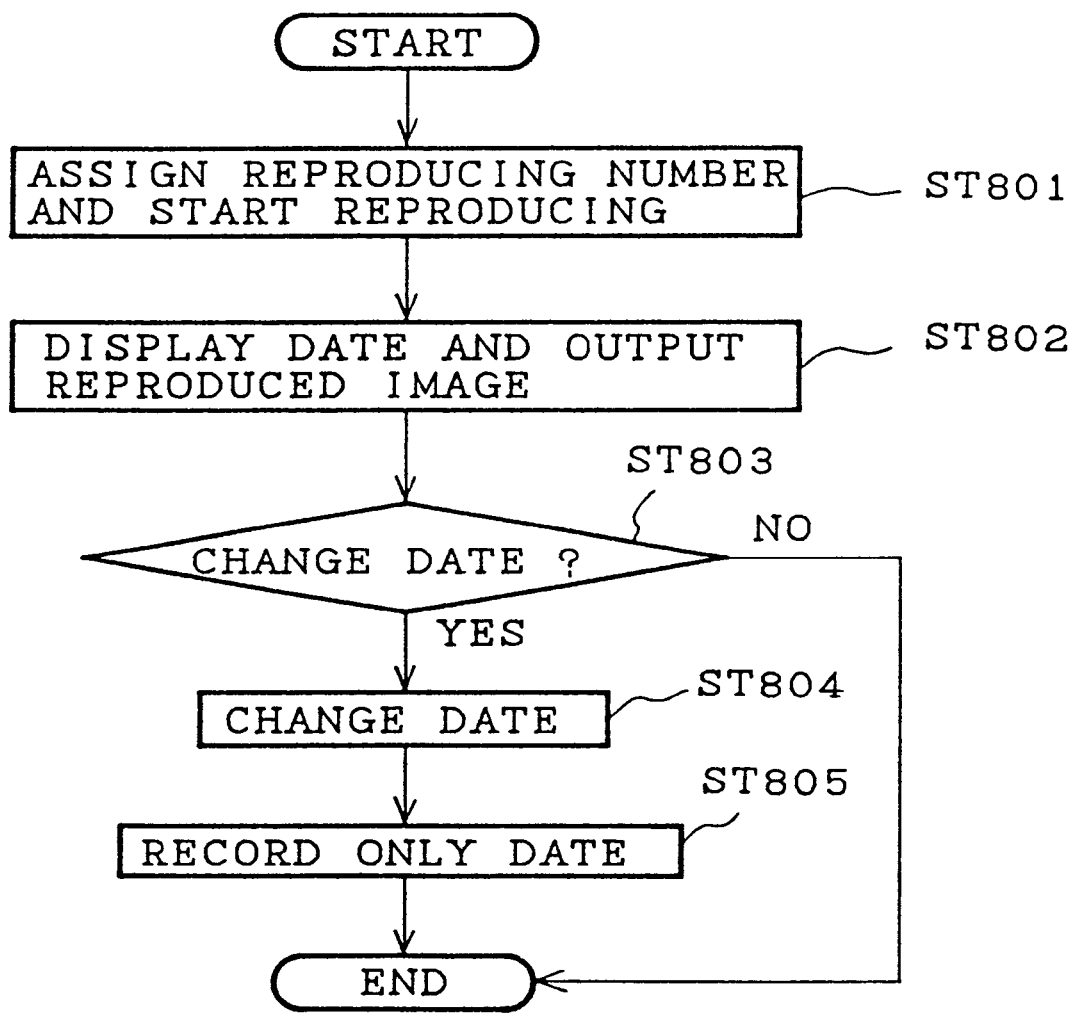
FIG. 8 is a flow chart showing operation of date editing of the still picture recording and reproducing apparatus according to the embodiment shown in FIG. 6.

Next, operation in the case of varying the date data will be described together with a flow chart of FIG. 8. In this embodiment, since the date data are recorded in a separate location from the image data on the recording medium, during reproducing, the date is read separately from the image data and synthesized in the switch circuit 605 during image outputting. That is, if the image number is assigned and reproducing is started in step ST801, in step ST802, the date data are read by the recording and reproducing apparatus 101 and the information is sent to the-microcomputer 602. The microcomputer 602 controls the character generating circuit 606 and the switch control circuit 604 based on the received information, and character and image of the date data are synthesized and output by the switch circuit 605, and at the same time, the date data are stored in the memory 601.

The switch circuit 605 outputs only image or synthesizes character and image of the date data and outputs the synthesized data, according to command of the switch control circuit 604.

In step ST803, when the date data are varied and recorded, the process advances to step ST804 and the microcomputer 602 reads contents stored in the memory 616 and varies it arbitrarily and sends data to the recording and reproducing apparatus 101, and in step ST805, the date data only are varied and recorded. Since the date data are recorded in another location of the record medium separately from the image data, content of the image data is not at all varied then.

Figure 9:
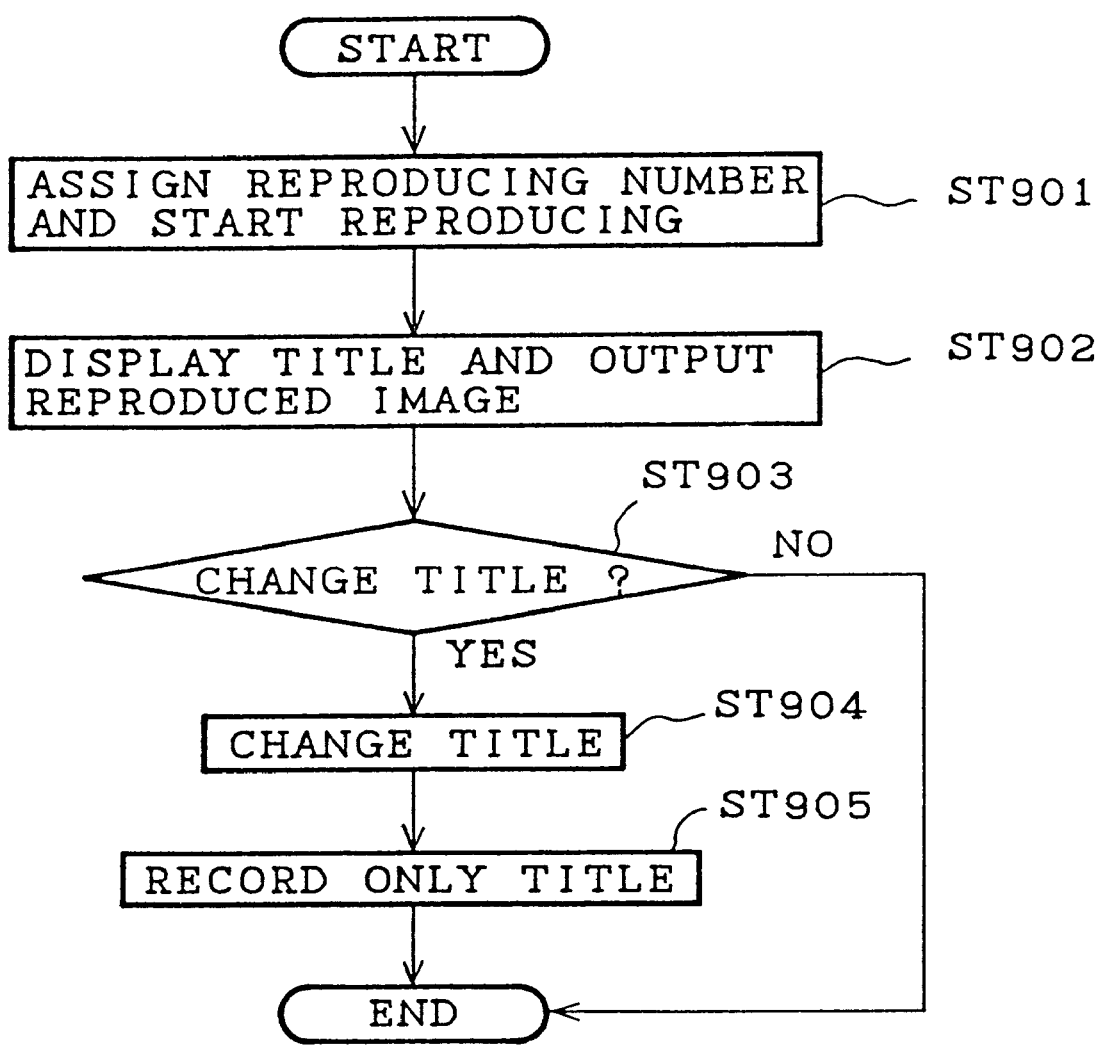
FIG. 9 is a flow chart showing operation of title editing of the still picture recording and reproducing apparatus according to the embodiment shown in FIG. 6.

Also when title is varied, according to steps ST901–ST905 in a flow chart of FIG. 9, the variation is carried out in similar procedure to that when the date data are varied as above described.

According to the embodiment 1, only one apparatus is required during editing although two apparatuses are required in the prior art, and operability is improved. Consequently, even if data are once recorded in the record medium, date data and title data can be simply varied and the convenience of the apparatus is improved.

Embodiment 2

Figure 10:
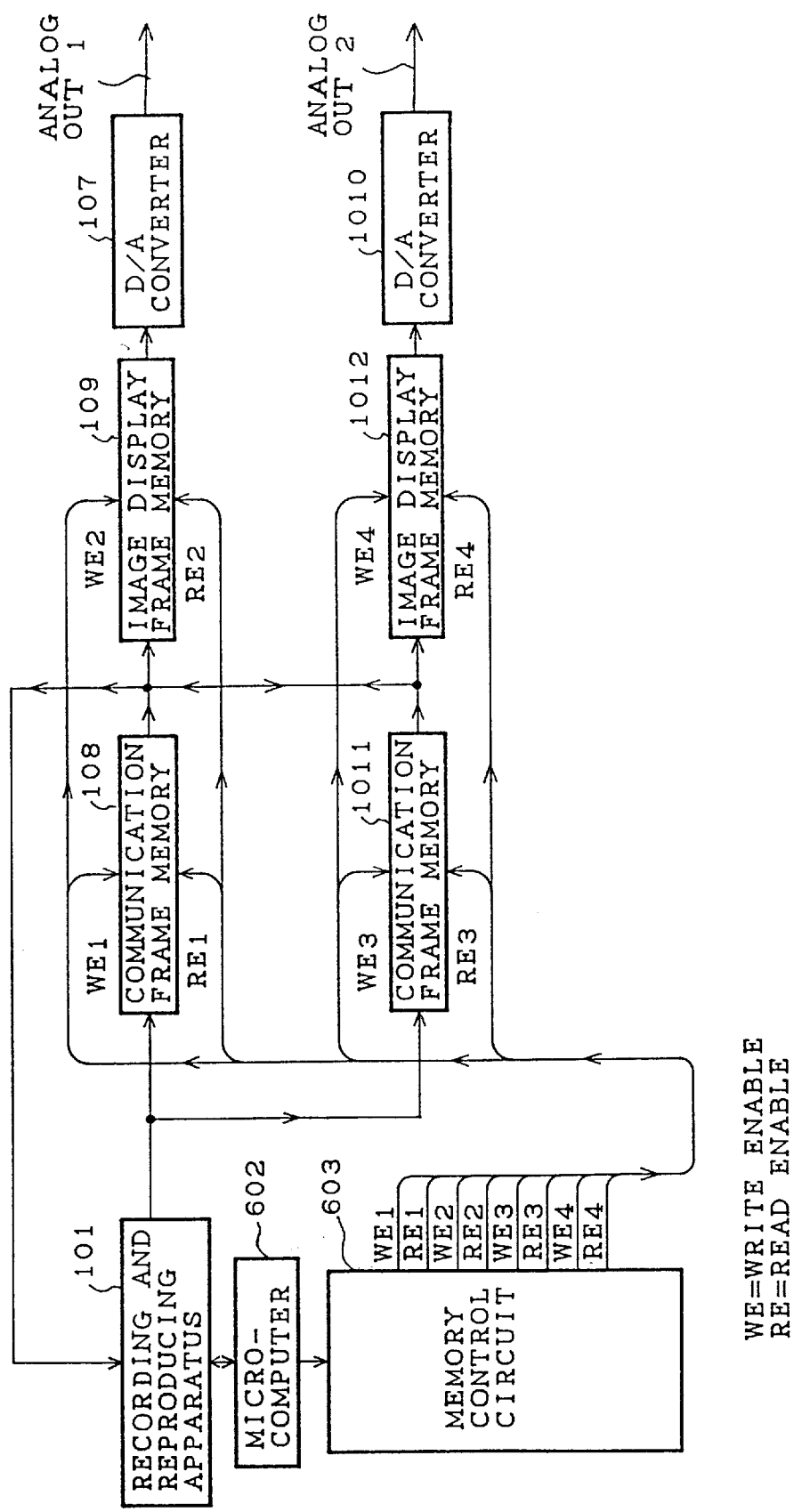
FIG. 10 is a block diagram showing a still picture recording and reproducing apparatus according to a third embodiment of the invention.

FIG. 10 is a diagram showing a still picture recording and reproducing apparatus in a second embodiment of the present invention. This embodiment includes with two frame memories for communication for storing reproduced images and two frame memories for image display.

In this embodiment, the operation of replacement of still picture image recorded before editing is stored in a frame memory and subjected to backup and the data are then utilized, thereby further improving operability.

Figure 1:
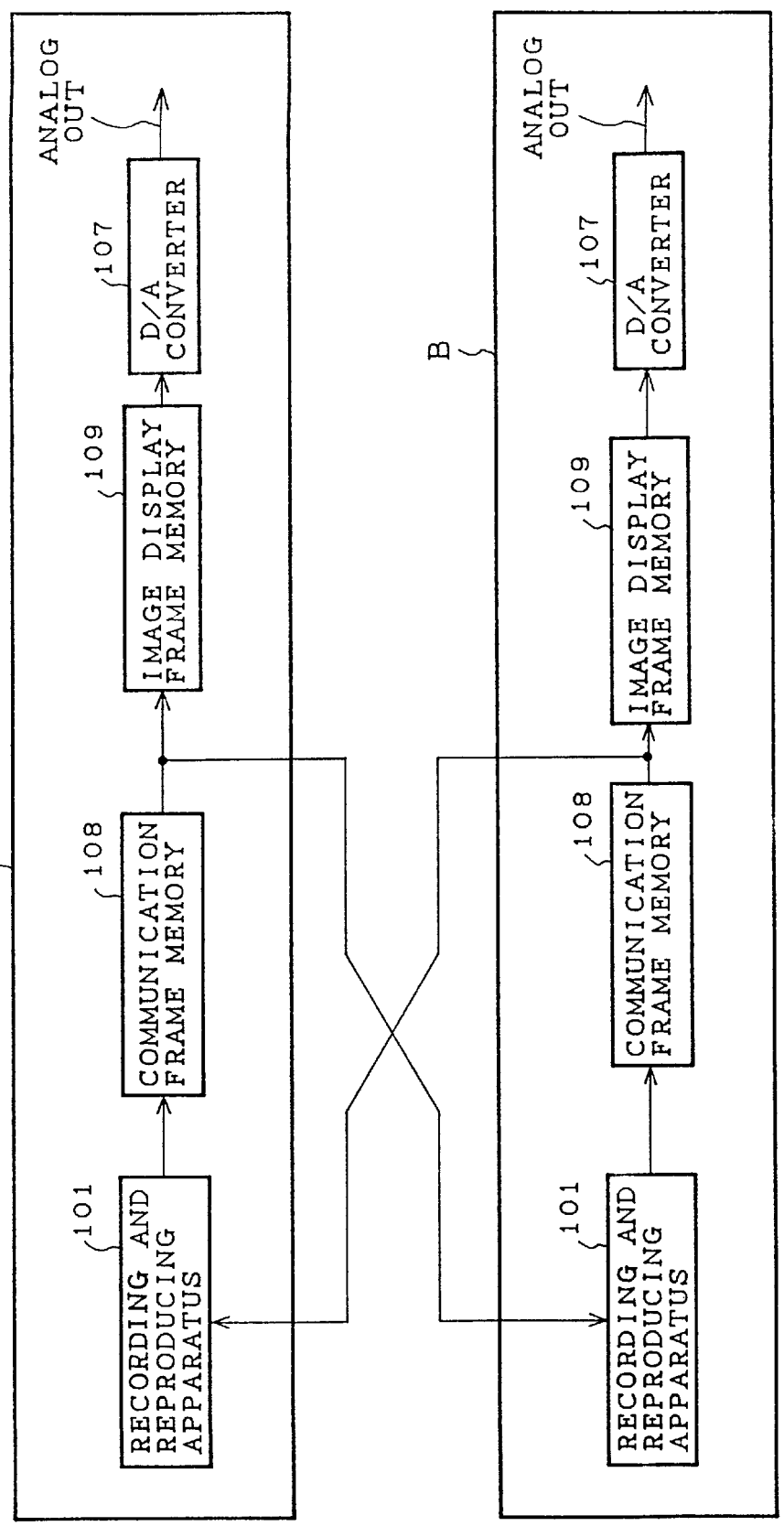
FIG. 1 is a block diagram showing a still picture recording and reproducing apparatus in the prior art.

In FIG. 10, numerals 101, 602, 603, 107, 108, 109 designate the same parts as those in FIG. 1. Numeral 1010 designates a D/A converter for converting image signals from digital into analog, numeral 1012 designates a frame memory for image display, and numeral 1011 designates a frame memory for communication as storage means between the recording and reproducing apparatus 101 and the frame memory 1012 for image display.

As an example, replacement of still picture images of image numbers 1 and 2 will be described. First, the image data of number 1 are reproduced from the recording and reproducing apparatus 101 and written in the frame memory 108 for communication by reproducing clock. Then the frame memory 1011 for communication is write disabled. Next, the image data of number 2 are reproduced from the recording and reproducing apparatus 101 and written in the frame memory 108 for communication is write disabled. Next, the image data of number 2 are reproduced from the recording and reproducing apparatus 101 and written in the frame memory 1011 for communication by reproducing clock. Then the frame memory 108 for communication is disabled. Afterwards the image data of number 1 are recorded from the frame memory 108 for communication to a position number 2 on the record medium, and after finishing it, the image data of number 2 may be recorded from the frame memory 1011 for communication to position of number 1 on the record medium. The frame memory 108 for communication and the frame memory 1011 for communication are always operated alternately and not simultaneously. Then the image of number 1 is written from the frame memory 108 for communication to the frame memory 109 for image display by image display clock, and is displayed through the D/A converter 107. Also the image of number 2 is displayed through the frame memory 1011 for communication, the frame memory 1012 for image display, and the D/A converter 1010. Since images to be replaced can be seen, this is convenient for editing.

In such constitution, the two still pictures can be replaced simply. Also since content of the frame memory 108 for communication can be written in the frame memory 1012 for image display and content of the frame memory 1011 for communication can be written in the frame memory 109 for image display, the two still picture images can be changed in a moment and seen by one monitor.

Embodiment 3

Figure 11:
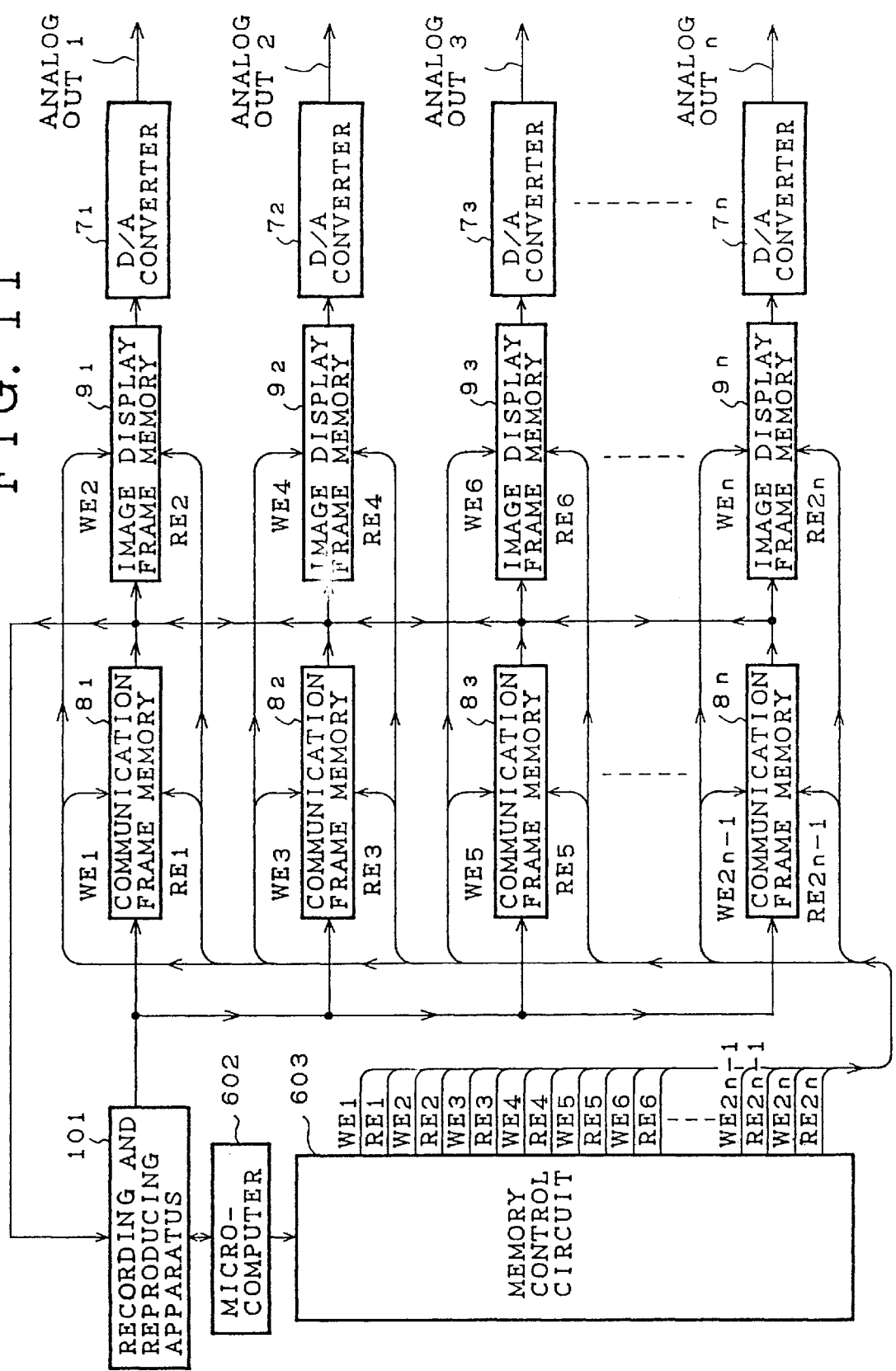
FIG. 11 is a block diagram showing a still picture recording and reproducing apparatus according to a third embodiment of the invention.

The case of replacing the two still picture images has been described, and when n pieces of still picture images are replaced, as shown in FIG. 11, frame memories 8-1--8-n- for communication as n pieces of storage means, frame memories 9-1--9-n- for image display and D/A converters 7-1--7-n- are used.

Embodiment 4

Figure 2:
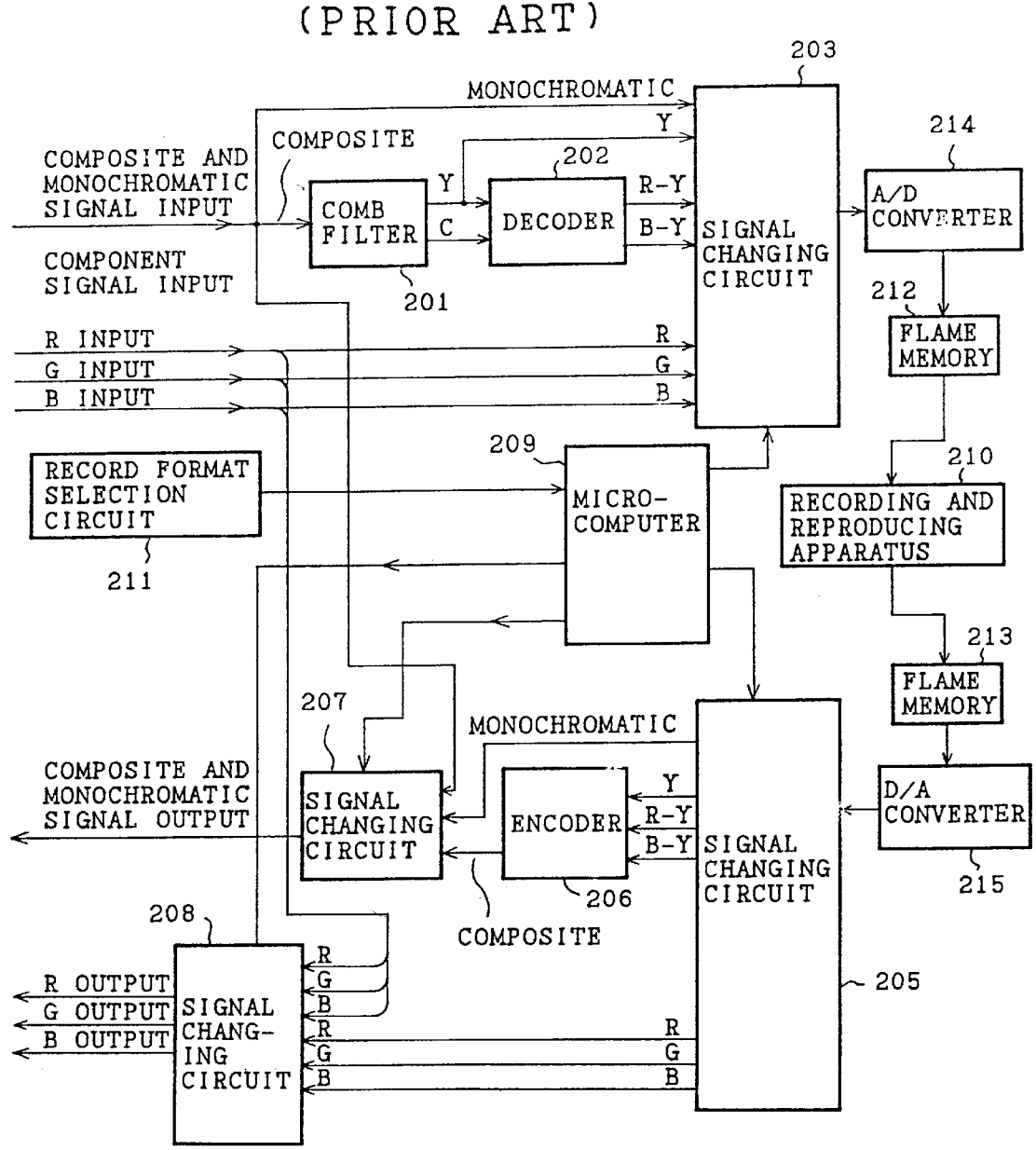
FIG. 2 is a block diagram showing a still picture recording and reproducing apparatus in the prior art.
Figure 5:
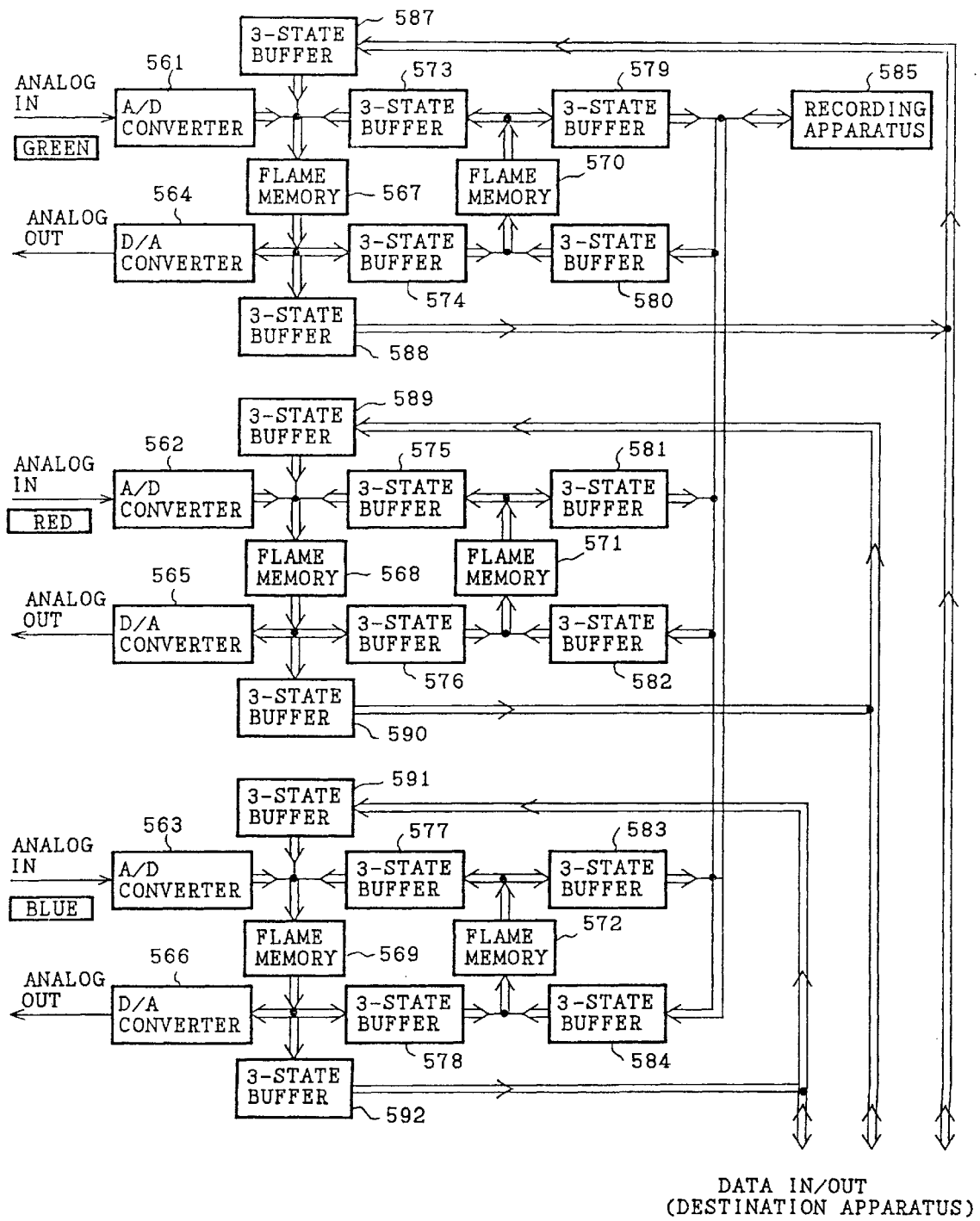
FIG. 5 is a block diagram showing a still picture dubbing apparatus in the prior art.
Figure 12:
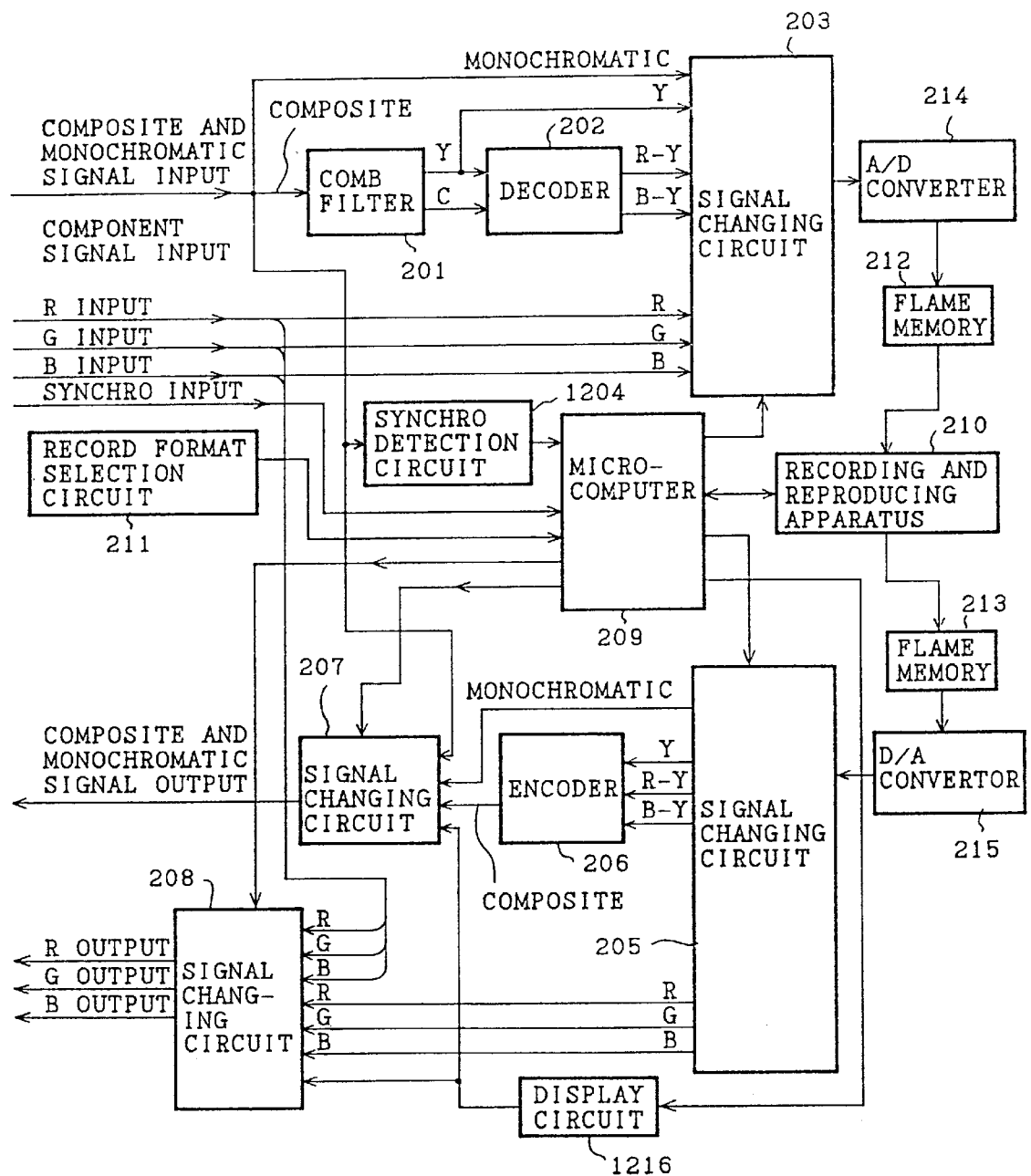
FIG. 12 is a block diagram showing a still picture recording and reproducing apparatus according to a fourth embodiment of the invention.

FIG. 12 is a block diagram showing a still picture recording and reproducing apparatus according to a fourth embodiment of the present invention. Parts corresponding to those in FIG. 2 are designated by the same numerals and their description shall be omitted.

In FIG. 12, numeral 1204 designates a synchro signal detection circuit for detecting synchro signals from inputted monochromatic and composite signals, and numeral 1216 designates a display circuit for displaying the number of residual record sheets, error message or the like.

Figure 13:
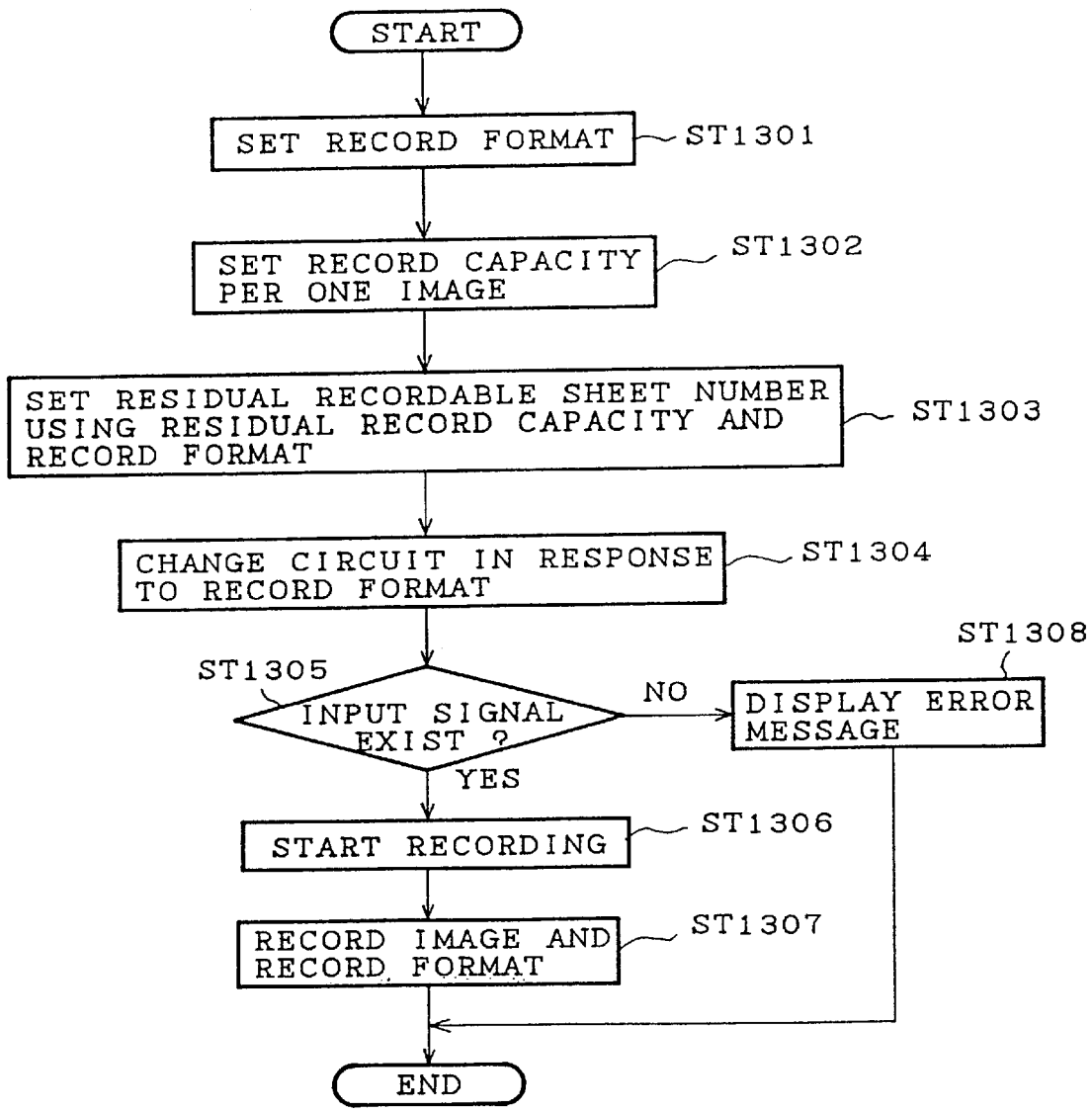
FIG. 13 is a flow chart showing operation during recording of the still picture recording and reproducing apparatus according to the embodiment shown in FIG. 12.
Figure 14:
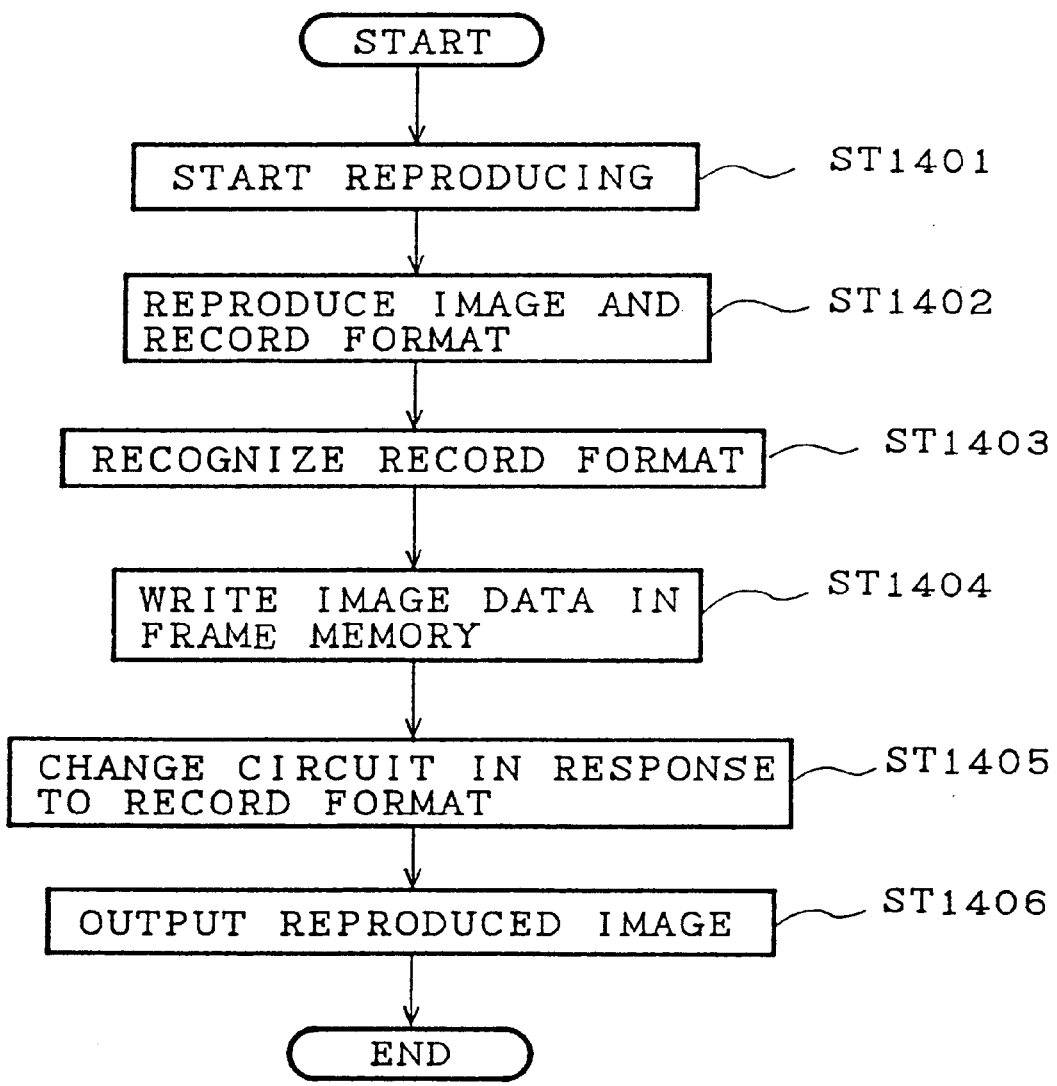
FIG. 14 is a flow chart showing operation during reproducing of the still picture recording and reproducing apparatus according to the embodiment shown in FIG. 12.

FIG. 13 is a flow chart showing operation of the apparatus during recording, and FIG. 14 is a flow chart showing operation of the apparatus during reproducing.

Next, operation during recording will be described referring to FIGS. 12 and 13. In step ST1301, information of a recording format selected by a switch within the recording format selection circuit 211 is sent to the microcomputer 209, and corresponding to this, the signal changing circuit 203 is changed in step ST1304. When the input signal is a monochromatic signal, the input signal is written through the signal changing circuit 203 and the A/D converter 214 into the frame memory. After the writing is finished, in steps ST1306 and ST1301, the data are read out from the frame memory 212 and recorded to the recording medium of the recording apparatus 210. Then together with the image, the recording format is also recorded. When the input signal is a composite signal, the input signal passes through the comb filter 201, the detector 202 and the signal changing circuit 203. Later operation is the same as that in the monochromatic signal. When the input signal is RGB signals, the input signal passes through the signal changing circuit 203. Later operation is the same as that in the monochromatic signal and the composite signal.

If the RGB signal and the monochromatic signal with a small data amount have the same recording capacity, the recording medium cannot be utilized effectively. Therefore based on information of the recording format sent to the microcomputer 209, in step ST1302, the recording capacity per one picture plane is set and recorded. That is, the image by the monochromatic signal with a small data amount requires little recording capacity so that the number of sheets of image capable of being recorded becomes greater. On the other hand, since the RGB signal has a large data amount, the number of sheets capable of recording the image by the RGB signal becomes small but the clear image can be provided.

When images of different recording formats are recorded in one recording medium, control of the recording medium becomes troublesome and the number of sheets of images capable of being recorded is not uniform thereby convenience of use is decreased. Consequently in this embodiment, one recording format only can be recorded in one record medium and a plurality of recording formats cannot be recorded. Therefore when the recording is carried out already and additional recording is to be carried out, the recording format cannot be varied. Such forbidding of the image recording by other format can be carried out in that the recording format set to the recording format selection circuit 211 in every recording is compared with the record format of the record medium. Regarding recording format of the image already recorded, when the image is recorded, at the same time, the recording format is also recorded, and during the reproducing, the image data are reproduced using this recording format. In addition, during recording operation, each output is the input signal monitored intact by the signal changing circuits 207, 208.

When the total recording capacity and the number of sheets already recorded are known, the total recording capacity is divided by the recording capacity per one image in response to the recording format, thereby the number of all recordable sheets is estimated, and the number of all recordable sheets is subtracted by the number of already recorded sheets thereby the number of residual recordable sheets is estimated. This is displayed by the display circuit 1216 in step ST1303. When the number of residual recordable sheets is known, convenience of use is improved.

When the recording format is a monochromatic signal or a composite signal, the synchro signal detection circuit 1204 effects decision whether a synchro signal exists or not, and sends the result to the microcomputer 209. Also when the record format is RGB signals, a synchro signal is sent to the microcomputer 209. In the microcomputer 209, if a synchro signal exists, in step ST1305, decision is effected that the input signal exists, and in steps ST1306 and ST1307, the recording is carried out. If the input signal does not exist, the recording is not carried out and in step ST1308, error message is displayed by the display circuit 1216. For example, when the recording format is set to RGB but a synchro signal corresponding to RGB signals is not input and in place of this, a composite signal is input, decision is effected that a synchro signal does not exist, and the recording is forbidden. Thereby erroneous recording due to error of setting of the recording format can be prevented.

Next, operation during reproducing will be described referring to FIGS. 12 and 14. When the reproducing is stored in step ST1401, the recording apparatus 210 reproduces image data in steps ST1402 and ST1403, and the recording apparatus 210 writes the data in the frame memory 213 in step ST1404. At the same time, reading is carried out regarding what is the format, and the result is sent to the microcomputer 209. In step ST1405, the microcomputer 209 changes the signal changing circuits 205, 207, 208 correctly in response to the recording format. On the other hand, in step ST1406, the image data are written in the frame memory 213, and then read out and pass through the D/A converter 215 and are outputted correctly to next stage by the signal changing circuit 205. When the signal is a monochromatic signal, it is output through the signal changing circuit 207. In the case of a composite signal, a composite signal is prepared from each signal of Y, R-Y, B-Y by the encoder 206 and is output through the signal changing circuit 207. In the case of RGB signals, the signal is outputted through the signal changing circuit 208.

In addition, the recording medium used in the present invention may be any medium to enable recording, such as a tape, a hard disk, a floppy disk, a magneto-optical disk or the like.

Although the recording format has been described in an example of monochromatic, composite or RGB signal, even if it is replaced by other signal in high vision system, MAC system, similar effect can be obtained.

Embodiment 5

Figure 15:
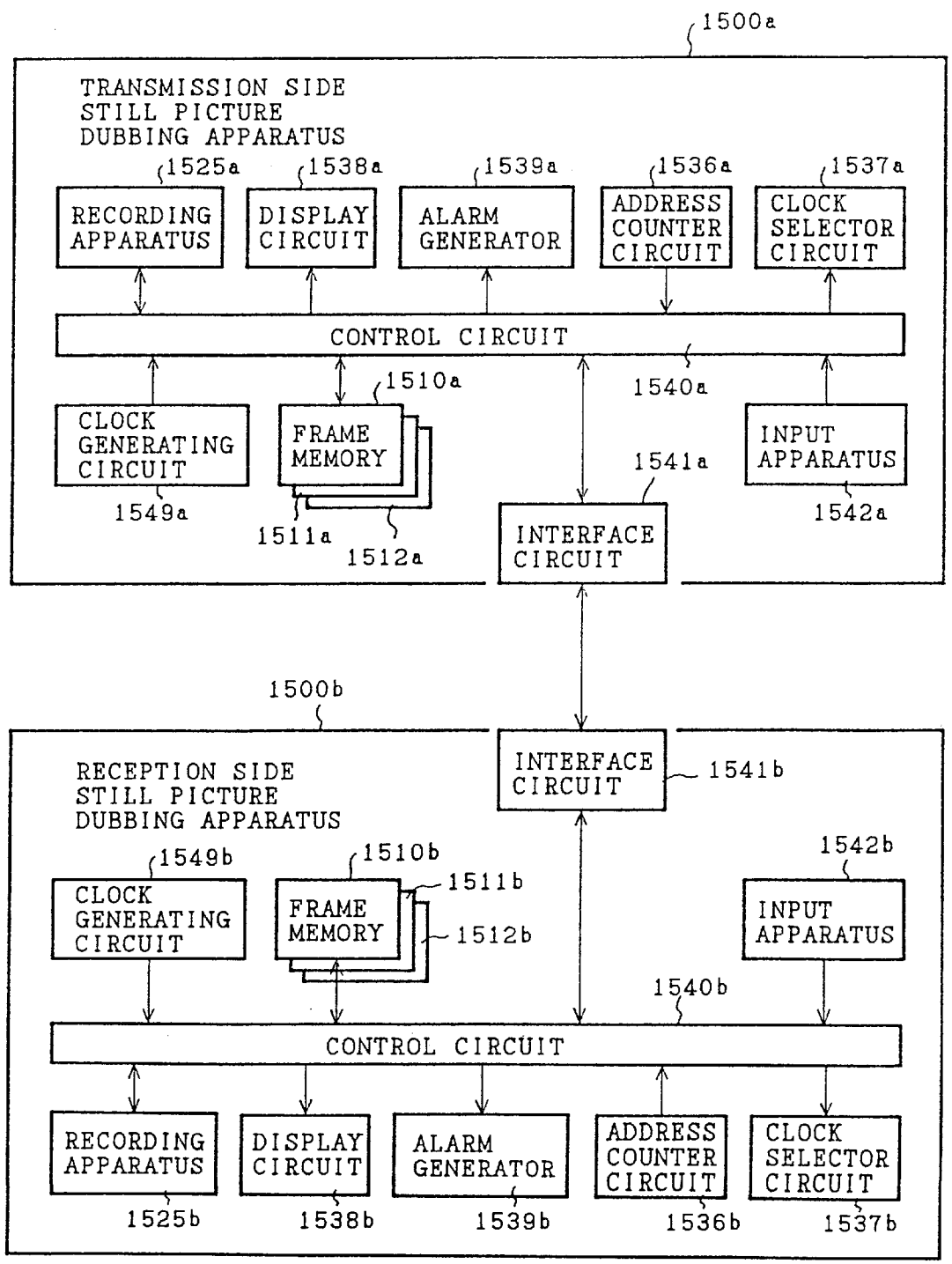
FIG. 15 is a block diagram showing a still picture dubbing apparatus according to a fifth embodiment of the invention.

FIG. 15 is a block diagram showing a still picture dubbing apparatus according to a fifth embodiment of the present invention. In FIG. 15, numeral 1500a designates a transmission side still picture dubbing apparatus, and numeral 1500b designates a reception side still picture dubbing apparatus. In embodiment 5, both still picture dubbing apparatuses at transmission side and reception side together constitute a system. Numerals 1510a, 1510b, 1511a, 1511b, 1512a, 1512b designate frame memories for communication of image data, numerals 1525a, 1525b designate recording apparatuses for storing image data, numerals 1537a, 1537b designate clock selector circuits, each selecting one among a plurality of clock signals, numerals 1538a, 1538b designate display circuits for displaying date, title, subsidiary information or the like, numerals 1538a, 1539b designate an alarm generators for generating alarm such as a buzzer, numerals 1540a, 1540b designate control circuits having a microcomputer for controlling each apparatus and circuit, numerals 1541a, 1541b designate interface circuits for carrying gut communication with a destination side still picture dubbing apparatus, numerals 1542a, 1542b designate input circuits having a key or a switch for inputting information of character, numeral or the like, and numerals 1549a, 1549b designate clock generators for generating plural different clocks to obtain a data rate ranging from low speed to high speed to data rate during image display.

Figure 16:
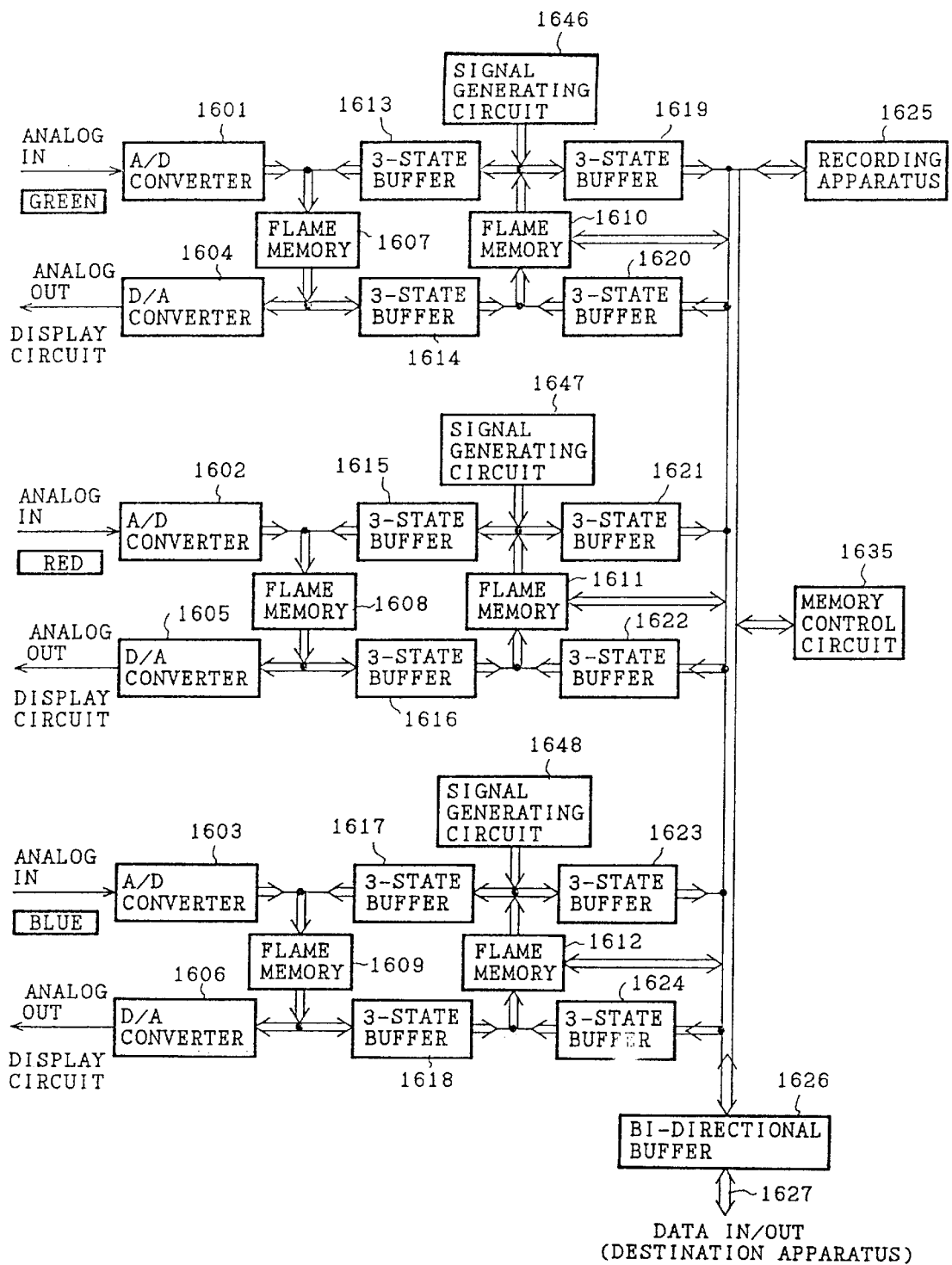
FIG. 16 is a block diagram showing in more detail, the still picture dubbing apparatus shown in FIG. 15.

FIG. 16 is a block diagram showing the still picture dubbing apparatus shown in FIG. 15, in more detail. In FIG. 16, numeral 1601 designates an A/D converter to enable three-state output for converting still picture data of a green image from analog into digital, numerals 1602, 1603 designate A/D converters for red, blue respectively, numeral 1604 designates designates a D/A converter for converting still picture data of a green image from digital into analog, numerals 1605, 1606 designate D/A converters for red, blue respectively, numeral 1607 designates a frame memory for exclusive display of green still picture image, numerals 1608, 1609 designate frame memories for exclusive display of red and blue still picture images respectively, numeral 1610 designates a frame memory used for communication between a recording apparatus 1625 described later and the frame memory 1607, and numerals 1611, 1612 designate frame memories used for communication between the recording apparatus 1625 and the frame memories 1608, 1609 respectively.

Numeral 1613 designates a three-state buffer for transmitting data from the frame memory 1610 to the frame memory 1607, numerals 1615, 1617 designate three-state buffers for transmitting data from the frame memories 1611, 1612 to the frame memories 1608, 1609 respectively, numeral 1614 designates a three-state buffer for transmitting data from the frame memory 1607 to the frame memory 1610, numerals 1616, 1618 designate three-state buffers for transmitting data from the frame memories 1611, 1612 respectively, numeral 1619 designates a three-state buffer for transmitting data from the frame memory 1610 to the recording apparatus 1625, numerals 1621, 1623 designate three-state buffers for transmitting data from the frame memories 1611, 1612 to the recording apparatus 1625 respectively, numeral 1620 designates a three-state buffer for transmitting data from the recording apparatus 1625 to the frame memory 1610, and numerals 1622, 1624 designate three-state buffers for transmitting data from the recording apparatus 1625 to the frame memories 1611, 1612 respectively. Numeral 1625 designates a recording apparatus containing recording media such as a tape, a disc or the like. Numeral 1626 designates a bi-directional buffer for dubbing. Numeral 1627 designates a signal line for transmitting image data, for example, in the order of green, red and blue. Thus the image data of green, red, blue are transmitted on one signal line 1627 in the dubbing. Numeral 1635 designates a memory control circuit, and numeral 1646 designates a signal generating circuit for generating signals corresponding to horizontal and vertical synchronous signals corresponding to green deleted during recording from a destination apparatus (still picture dubbing apparatus) (not shown) to the recording apparatus 1625 and signals not used in the vicinity of both ends of the displayed picture plane. Numerals 1647, 1648 designate signal generating circuits corresponding to red, blue respectively.

In addition, the frame memories 1607, 1608, 1609 in FIG. 16 correspond to the frame memories 1510a, 1511a, 1512a in FIG. 15. The recording apparatus 1625 in FIG. 16 corresponds to the recording apparatus 1525a in FIG. 15.

Figure 17:
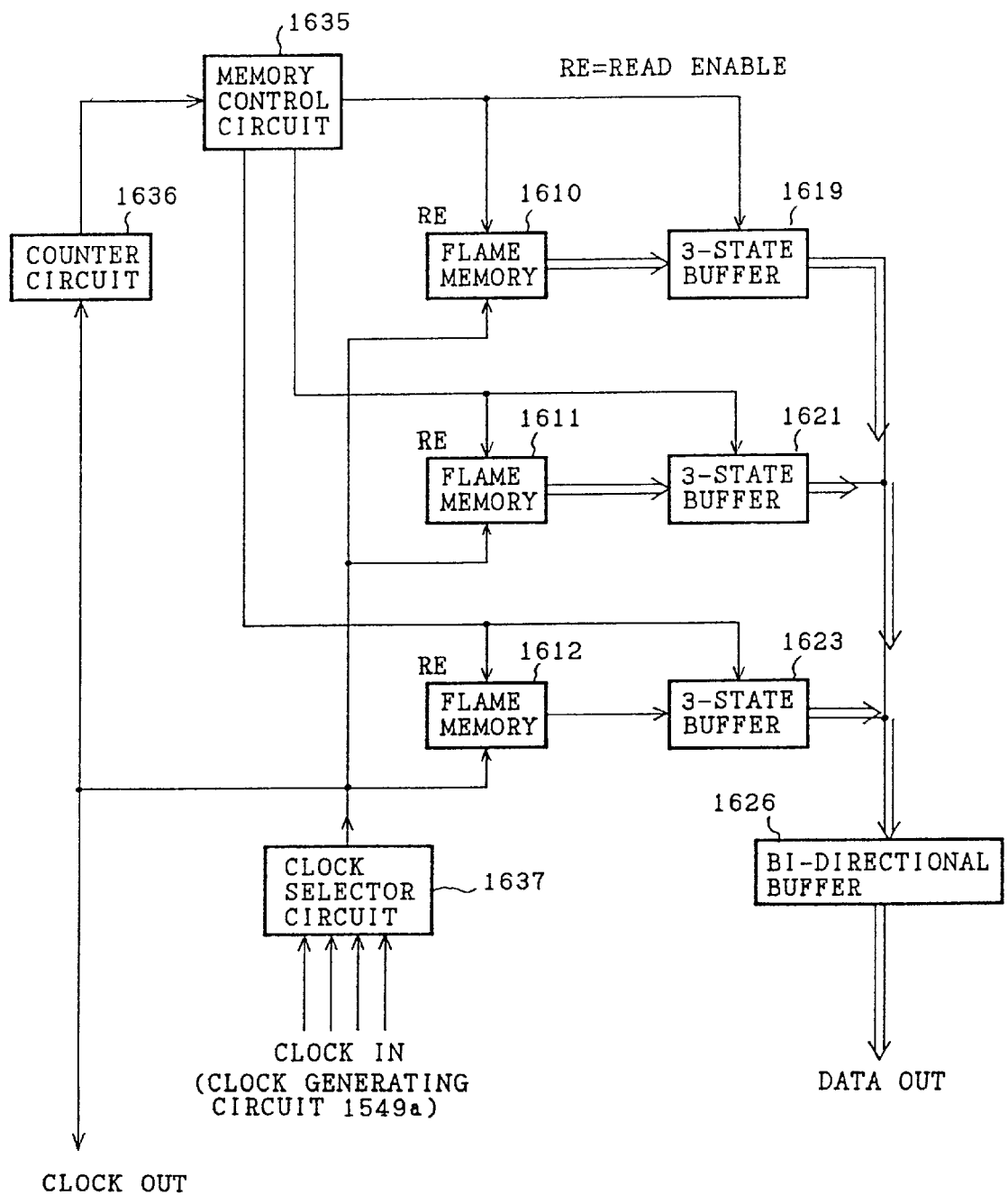
FIG. 17 is a block diagram showing the still picture dubbing apparatus in the embodiment shown in FIGS. 15 and 16 at data transmission side during dubbing.
Figure 18:
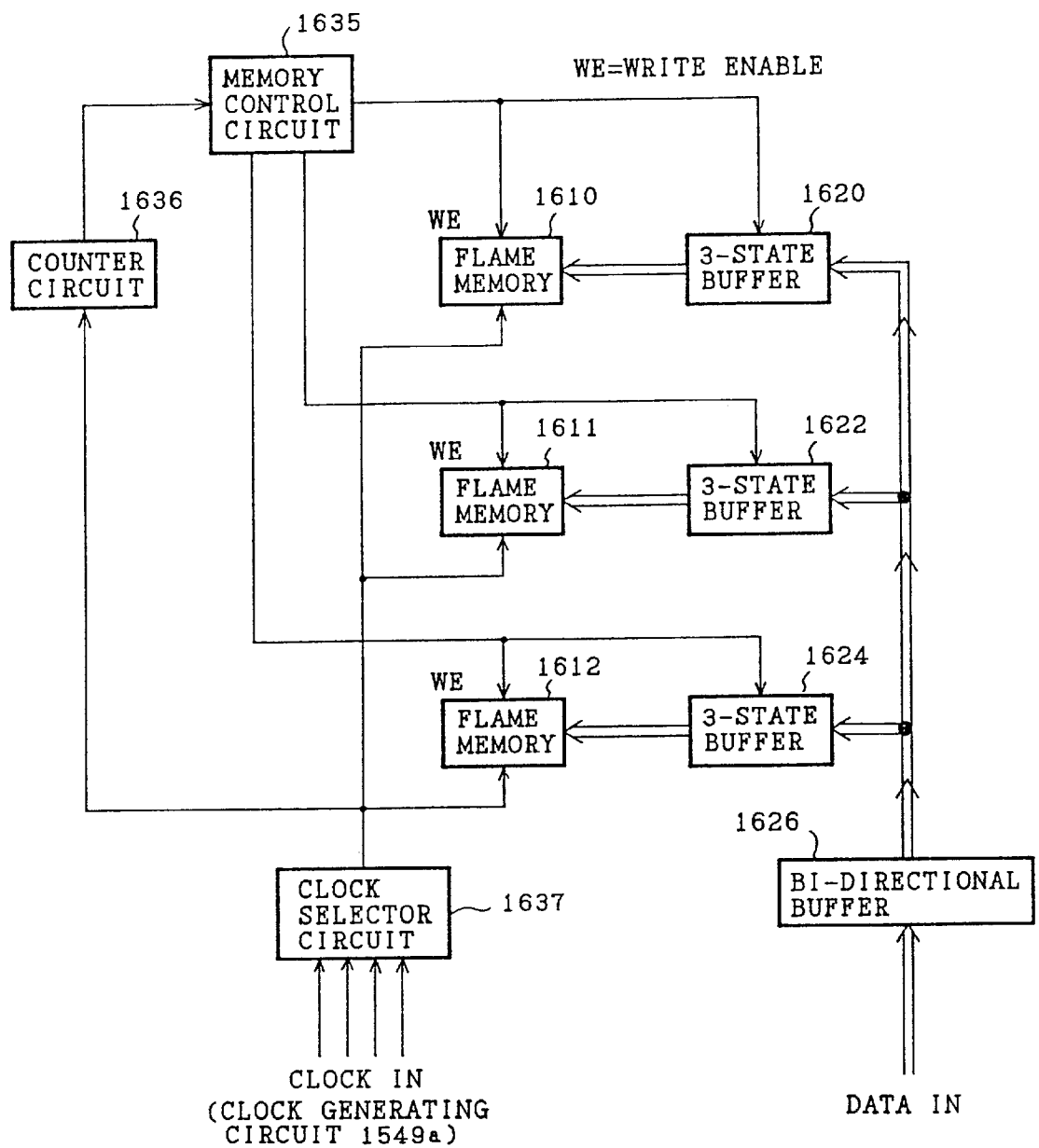
FIG. 18 is a block diagram showing the still picture dubbing apparatus in the embodiment shown in FIGS. 15 and 16 at data reception side during dubbing.

FIG. 17 is a block diagram showing a circuit during transmission of dubbing in the embodiment 5, and FIG. 18 is a block diagram showing a circuit during reception of dubbing in the embodiment 5. In FIGS. 17 and 18, the memory control circuit 1635 as above described controls the frame memories 1610, 1611, 1612 for communication of green, red, blue and the three-state buffers 1619, 1621, 1623, 1620, 1622, 1624. Numeral 1636 designates a counter circuit for counting the whole pixel number per one image and for transmitting the finishing signal to the memory control circuit 1635 after the count is finished. Numeral 1637 designates a clock selector circuit for selecting clocks to be supplied to the frame memories 1610, 1611, 1612 and the counter circuit 1636. In addition, the clock selector circuit 1637 corresponds to the clock selector circuit 1537a in FIG. 15. Also the counter circuit 1636 corresponds to the address counter circuit 1536a in FIG. 15.

Operation During Recording and Reproducing

In FIGS. 15–17, during recording, image data of green are subjected to analog-digital conversion by the A/D converter 1601 and written in the frame memory 1607. After the writing is finished, the image data are transferred from the frame memory 1607 to the frame memory 1610. In this case, when signals corresponding to the horizontal and vertical synchronous signals and unnecessary signals in the vicinity both ends of the display picture plane are subjected to data transfer respectively, the frame memory 1610 is made disable and control is carried out so that unnecessary part is not written in the frame memory 1610. This control is executed in the memory control circuit 1635. Afterwards the image data are read out from the frame memory 1610 in synchronization with clock of the recording apparatus 1625 thereby recording to the recording medium is carried out. Thus after recording of green is finished, in similar manner to the case of green, recording is carried out in the order of red, blue.

Also during reproducing, operations reverse to that during recording as above described are carried out. That is, when the data transfer is carried out from the frame memory 1610 to the frame memory 1607, signals deleted during recording are produced by the signal generating circuit 1646 and stored in adding to the frame memory 1607. During adding of this signal, the frame memory 1616 is set to read disable. This control is executed by the memory control circuit 1635. Also regarding the image data of red, blue, similar operation to the case of green is carried out. Thus control is carried out so that neither horizontal and vertical signals nor unnecessary signals on both ends of the picture plane are recorded to the frame memories 1610, 1611, 1612 as well as the record medium within the recording apparatus 1625.

Operation at Data Transmission Side During Dubbing

Image data (still picture data) already recorded in the recording medium of the recording apparatus 1625 are stored in the frame memories 1610, 1611, 1612 in the order of green, red, blue in synchronization with clock during reproducing apparatus 1625. First, in order to transmit the image data of green stored in the frame memory 1610, the frame memory 1610 is set to read enable by the memory control circuit 1635, and the three-state buffer 1619 is set to enable. The counter circuit 1636 and the frame memory 1610 are operated in synchronization with clock selected by the clock selector circuit 1637. Count value counted by the counter circuit 1636 is transmitted to the memory control circuit 1635. When the count value reached the pixel number of the still picture, the memory control circuit 1635 sets the frame memory 1610 to read disable and sets the three-state buffer 1619 to disable, and next sets the frame memory 1611 to read enable and sets the three-state buffer 1621 to enable. Subsequently, the memory control circuit 1635 reads out the image data of red of the frame memory 1611 in similar manner to the case of the frame memory 1610, and after finishing the reading, the memory control circuit 1635 sets the frame memory 1612 to read enable and sets the three-state buffer 1623 to enable, and reads the image data of blue from the frame memory 1612.

Thus the image data of green, red, blue read out from the frame memories 1610, 1611, 1612 pass through the bi-directional buffer 1616 and are sent to a destination apparatus at reception side on the same data line. Also clock selected by the clock selector circuit 1637 is sent intact to the destination apparatus at reception side on the same data line. Also clock selected by the clock selector circuit 1637 are sent intact to the destination apparatus at reception side.

Operation at Reception Side During Dubbing

Next, the image data (still picture data) of green sent from the destination apparatus at transmission side passes through the bi-directional buffer 1626 and the three-state buffer 1620, and are written first to the frame memory 1610. Operation to be written in the frame memory 1610 is as follows. The frame memory 1610 is set to write enable by control of the memory control circuit 1635, and the three-state buffer 1620 is set to enable. A clock transmitted from the destination apparatus at transmission side is selected by selection of the clock selector circuit 1637. The counter circuit 1636 and the frame memory are operated in synchronization with the selected clock. A count value counted by the counter circuit 1636 is transmitted to the memory control circuit 1635. If the count value reaches the pixel number of the still picture, the memory control circuit 1635 determines that writing of the image data of green is finished, and sets the frame memory 1610 to write disable and sets the three-state buffer 1620 to disable, and next sets the frame memory 1611 to write enable and sets only the three-state buffer 1622 to enable. Subsequently, the memory control circuit 1635 writes the image data of red in the frame memory 1611 in similar procedure to the case of the frame memory 1610, and when the writing is finished, the memory control circuit 1635 sets the frame memory 1612 to write enable and sets only the three-state buffer 1624 to enable and writes the image data of blue in the frame memory 1612. Thus when the writing of data of green, red, blue of the frame memories 1610, 1611, 1612 is finished, the image data are recorded to the recording apparatus 1625 in similar procedure to that of recording operation to the recording apparatus 1625 as above described.

Figure 19:
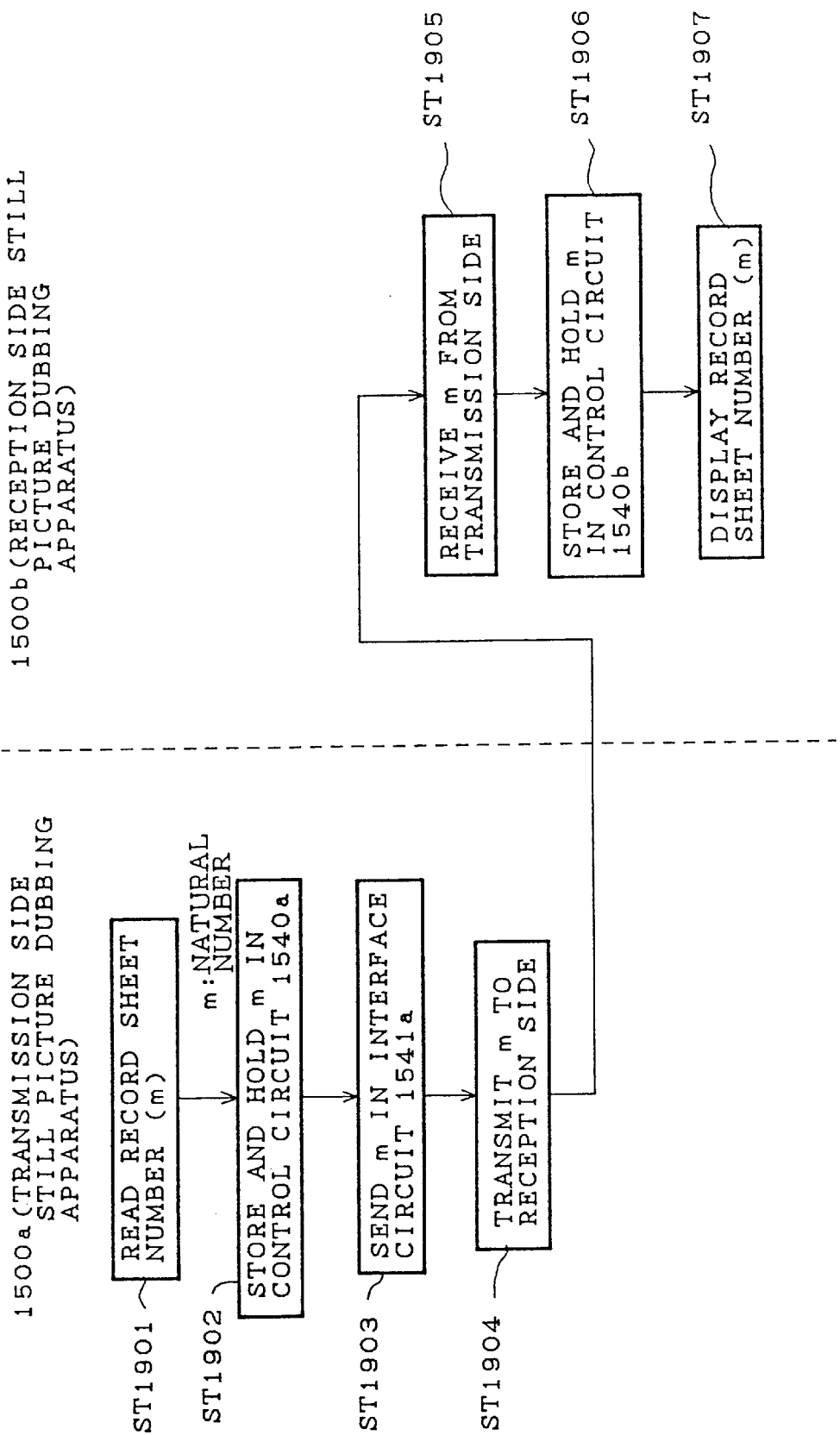
FIG. 19 is a flow chart explaining the procedure from sending the number of recorded sheets at the transmission side to the reception side until displayed at reception side in the embodiment shown in FIGS. 15–18.

Operation of Transmission/Reception and Display of the Number of Recorded Sheets FIG. 19 is a flow chart explaining procedure of sending the number of recorded sheets at transmission side to reception side until displayed at reception side in embodiment 5. In the transmission side still picture dubbing apparatus 1500a, the number of recorded sheets of the record medium is read in the recording apparatus 1525a (step ST1901). The number of recorded sheets is sent to the control circuit 1540a and stored and held (step ST1902). The control circuit 1540a sends the received number of recorded sheets to the interface circuit 1541a (step ST1903). Data indicating the number of recorded sheets are transmitted through the interface circuit 1541a to the interface circuit 1541b at reception side (step ST1904). In the reception side still picture dubbing apparatus 1500b, data indicating the number of recorded sheets are received through the interface circuit 1541b (step ST1905), and stored and held in the control circuit 1540b (step ST1906). The control circuit 1540b sends data indicating the received number of recorded sheets to the display circuit 1538b, and the number of recorded sheets is displayed by the display circuit 1538b (step ST1907).

According to the embodiment 5 as above described, following effects can be obtained.

(1) Transfer clock during dubbing can be selected and data rate can be set freely. Therefore transfer during dubbing is carried out at data rate of lower speed than data rate used during image display. As a result, influences due to crosstalk of other signal lines, unnecessary radiation, timing relation between data and clock, attenuation of signal can be suppressed.

(2) In the transfer during dubbing, the horizontal and vertical synchronous signals and unnecessary signals on both ends of the picture plane are omitted, and only necessary image data are transferred, thereby the time is reduced and the transferred data quantity becomes the irreducible minimum and the transmission efficiency can be improved.

(3) The image data of each color are output in time difference so that the data transfer of green is finished subsequently the data transfer of red is carried out and subsequently the data transfer of blue is carried out. Consequently the signal line of one system is sufficient. Therefore the number of dubbing terminals is decreased and the connector can be designated to be small and the space efficiency can be improved. Also in color difference signals of Y, R-Y, B-Y the same effect can be obtained.

(4) Since information of the number of recorded sheets at transmission side can be displayed at reception side, setting of the number of dubbing sheets can be helped and the convenience of use is improved.

Embodiment 6

Next, manual dubbing function in embodiment 5 will be described. The function can be assigned from the input apparatus 1542a shown in FIG. 15.

Manual Dubbing Function

Usually in a magnetic tape, format timing in a short time as in a magnetic disc is impossible. That is, in a tape of 120 minutes, time of 120 minutes is required to complete the format timing.

Consequently, when a still picture is recorded using a magnetic tape, general use is in that the formatting of the tape is not carried out previously and the tape with no format timing is recorded from the winding beginning in sequence. If consecutive numbers (1, 2, 3, . . . n-1, n, n: natural number) indicating the recording order are added to a still picture recorded in the magnetic tape simultaneously with recording of the still picture, control of the still picture can be carried out by numeral, and at the same time, retrieval can be also carried out easily. In this embodiment, dubbing is carried out using the number designated to individual image as above described.

Figure 20:
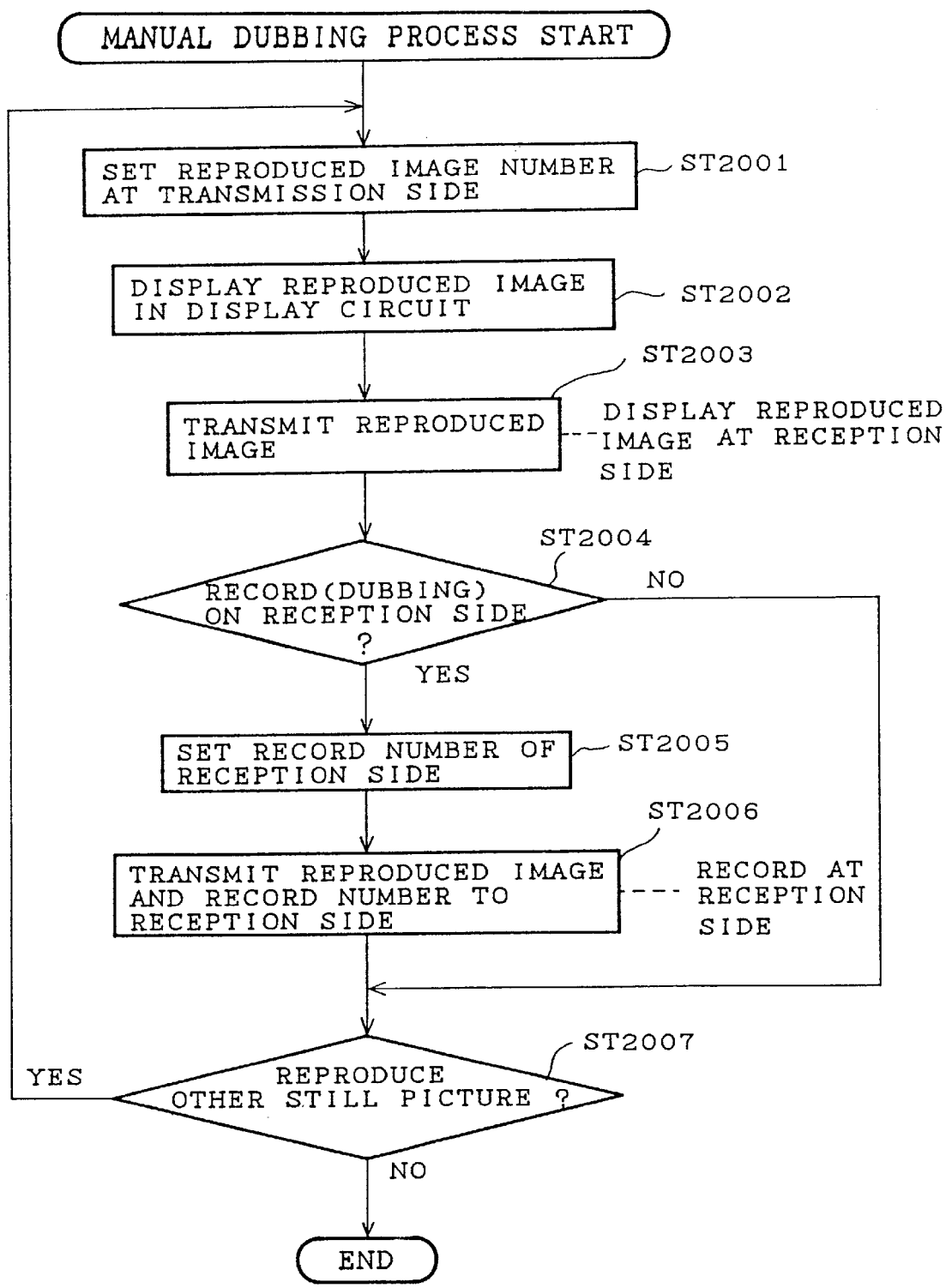
FIG. 20 is a flow chart explaining the operation of manual dubbing function according to the embodiment shown in FIGS. 15–18.

Next, operation will be described. FIG. 20 is a flow chart explaining operation of manual dubbing function according to an embodiment of the present invention. First, on the transmission side, the reproducing image number at transmission side is set by the input apparatus 1542a (step ST2001), and the reproducing image (still picture) corresponding to the reproducing image number is reproduced and displayed in the display circuit 1538a (step ST2002). Then the reproduced image is displayed not only in the display circuit 1538a at transmission side but also in the display circuit 1538b at reception side. Image data transmitted from transmission side are written in the frame memories 1610, 1611, 1612 at reception side, and the data are written through the three-state buffers 1613, 1615, 1617 into the frame memories 1607, 1608, 1609, and the data are further subjected to analog conversion by the D/A converter 1604, 1605, 1606 and reproduced and displayed (step ST2003).

Next, a user whether the recording (dubbing) should be done or not viewing the reproduced image at reception side. Then in the transmission side still picture dubbing apparatus 1500a, if command for recording (dubbing) is input from the input apparatus 1542a (step ST2004), subsequently the record number at reception side is set by the input apparatus 1542a and allocated to the existing reproduced image (step ST2005). The reproduced image and the record number are transmitted to reception side (step ST2006), and recorded to the recording apparatus 1525b at reception side. Further if command of dubbing to other still picture is inputted from the input apparatus 1542a, process is returned to step ST2001 (step ST2007), and the above-mentioned operation is carried out repeatedly.

In the manual dubbing function as above described, control by the transmission side dubbing apparatus 1500a is mainly carried out, the present invention is not limited to this, but the above-mentioned operation may be carried out by the reception side still picture dubbing apparatus 1500b, or control at transmission side still and reception side may be separated and the transmission side still picture dubbing apparatus may take charge of setting of the reproduced image number (step ST2001) to the recording decision to reception side (step ST2004) and reproducing of other still picture (step ST2007) and the reception side still picture dubbing apparatus 1500b may take charge of recording at reception side (step ST2005) to reproducing of other still picture (step ST2007).

As above described, in the manual dubbing function, when the dubbing is carried out per one still picture, the desired still picture can be specified by manual operation.

Embodiment 7

Next, auto dubbing function in embodiment 5 will be described. The function can be assigned from the input apparatus 1542a shown in FIG. 15.

Auto Dubbing Function

Figure 21:
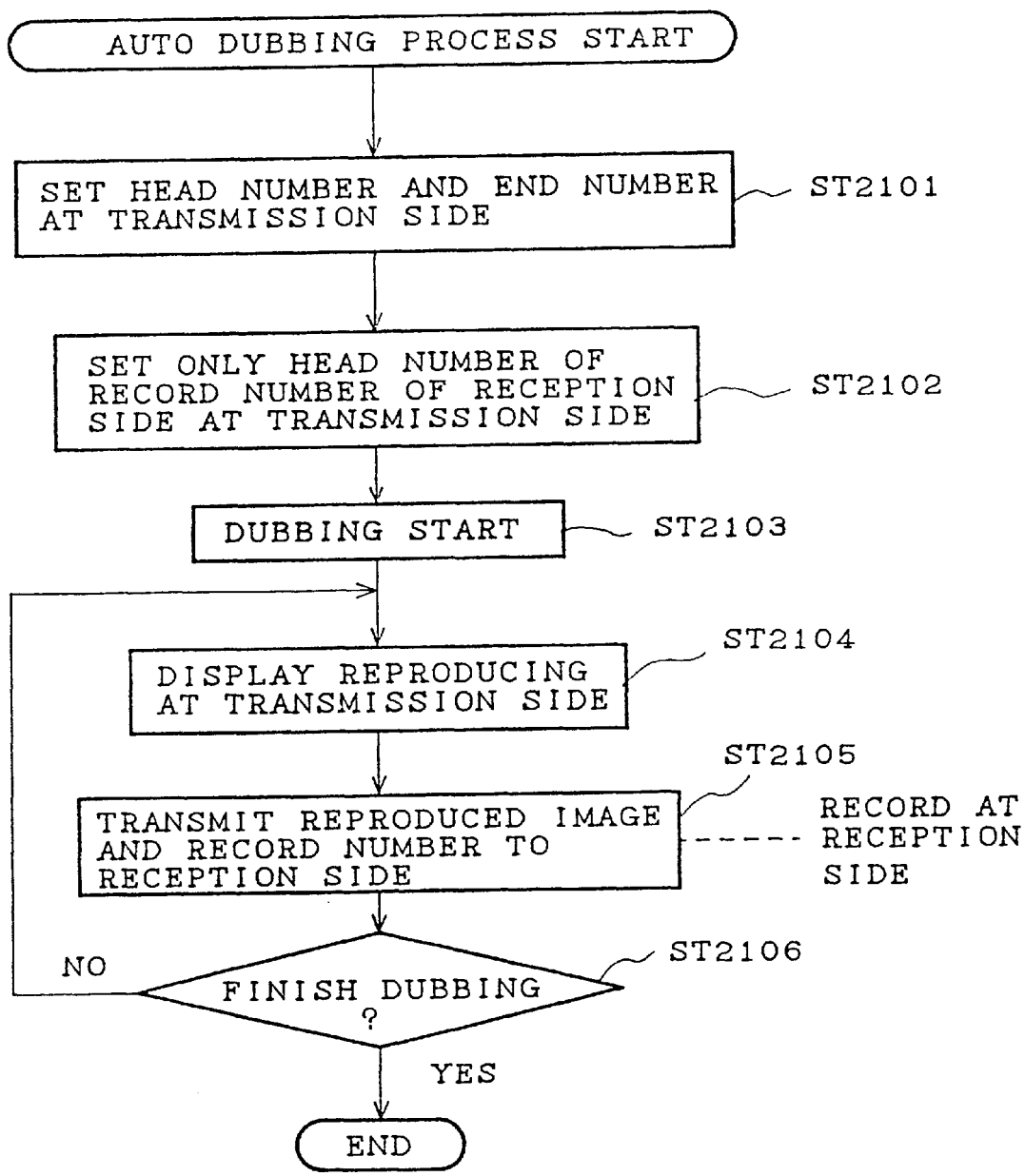
FIG. 21 is a flow chart explaining operation of auto dubbing function according to the embodiment shown in FIGS. 15–18.

FIG. 21 is a flow chart explaining operation of auto dubbing function according to another embodiment of the present invention. At the transmission side, the head number and the end number of the reproduced image number are set by the input apparatus 1542a (step ST2101). Further at the transmission side, regarding the record number at reception side, only the head number is set by the input apparatus (step ST2102). In setting of step ST2102, the process of setting the record number at the end of reception side shall be omitted, Next, dubbing from transmission side to reception side is started (step ST2103), at transmission side, first the reproducing image (still picture) corresponding to the reproduced image number on the head is reproduced and displayed in the display circuit 1538a (step ST2104), and the reproduced image and the record number corresponding to the reproduced image number on the head are transmitted to reception side (step ST2105). In the recording apparatus 1525b at reception side, the reproduced image is recorded in response to the record number received from transmission side. The reproduced image from then to the end number is displayed and transmitted in sequence in step ST2104 and step ST2105 in similar manner to the case of the head number as above described. Thus at transmission side and reception side, if dubbing processing corresponding to setting in steps ST2101 and ST2102 is finished (step ST2106), the auto dubbing operation is finished. Thus when a plurality of still pictures are subjected to dubbing continuously and automatically, by only assigning the still picture at the head and the end, transfer can be carried out simply.

In the above-mentioned auto dubbing function, although control by the transmission side still picture dubbing apparatus 1500a is carried out mainly, the present invention is not limited to this, but control may be carried out by the reception side still picture dubbing apparatus 1500b or control at transmission side and reception side may be separated and each still picture dubbing apparatus may take charge of it.

Regarding both dubbing functions in manual and auto as above described, although an example of using a magnetic tape in the record medium has been described, the present invention is not limited to this but the same effect can be obtained even using the record medium such as a magnetic disc.

Although not shown in the embodiments 6 and 7, both dubbing function of manual and auto may be freely changed, proper use of dubbing of one still picture only or a plurality of still pictures can be carried out corresponding to the user's purpose. That is, both dubbing functions manual and auto can be freely selected in response to the user's purpose, in order to improve convenience of use.

Embodiment 8

Figure 22:
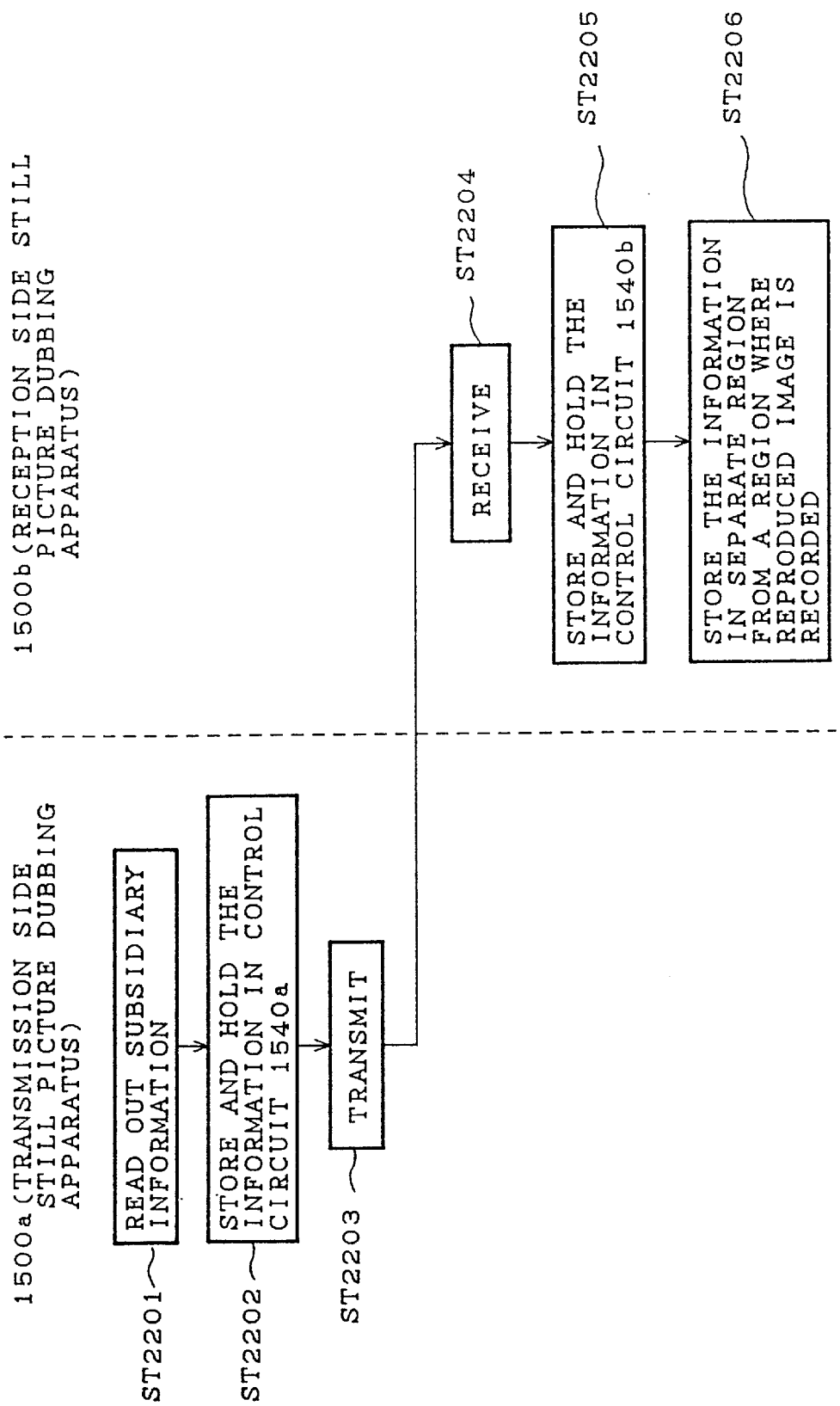
FIG. 22 is a flow chart explaining transfer % display function of subsidiary information according to the embodiment shown in FIGS. 15–18.

FIG. 22 is a flow chart explaining transfer and display procedure of subsidiary information according to an embodiment of the present invention. In of FIG. 15 as above described, embodiment 8 is provided with a function of transmitting and displaying the subsidiary information such as date, title or the like, to the destination apparatus. In this case, communication is carried out between the interface circuits 1541a, 1541b at transmission side and reception side.

In FIGS. 15 and 16, if dubbing is commanded from the input apparatus 1542a at transmission side, reproduced image is read out from the recording apparatus 1525a and written in the frame memories 1610, 1611, 1612 and read out from the frame memories 1610, 1611, 1612. In the embodiment 8, the subsidiary information such as date, title or the like and the reproduced image are previously stored so that the storage regions on the record medium (magnetic tape, magnetic disc or the like) are separated, and the subsidiary information is also subjected to dubbing according to dubbing commands. In addition, in the dubbing processing, together with the subsidiary information the still picture is also subjected to the dubbing, but in FIG. 22, description regarding dubbing of the still picture shall be omitted.

According to FIG. 22, after a dubbing command is input, the subsidiary information is read out from the recording apparatus 1525a (step ST2201), and is sent directly to the control circuit 1540a shown in FIG. 15 and stored and held (step ST2202). The subsidiary information stored and held in the control circuit 1540a is transmitted through the interface circuits 1541a, 1541b from transmission side to reception side (step ST2203), and is received at reception side (step ST2204) and stored and held in the control circuit 1540b (step ST2205). Further the subsidiary information stored and held in the control circuit 1540b is recorded in a separate storage region from the reproduced image on the storage medium of the recording apparatus 1525b (step ST2206). Afterwards, during reproducing, the subsidiary information is read out from the recording apparatus 1525b and displayed through the control circuit 1545b by the display circuit 1538b. When operation of the display circuit 1538b is stopped, display is not carried out.

As above described, according to the embodiment 8, the still picture signal and the prescribed subsidiary information can be prepared independently, and after the dubbing can be revealed or erased and can be accommodated to editing thereby improving convenience of use of the device.

Dubbing can be assigned arbitrarily in the subsidiary information solely or in subsidiary information and the still picture integrally by the input apparatus. Of course, it may be removed from the dubbing object or assigned by the input apparatus.

Embodiment 9

Figure 23:
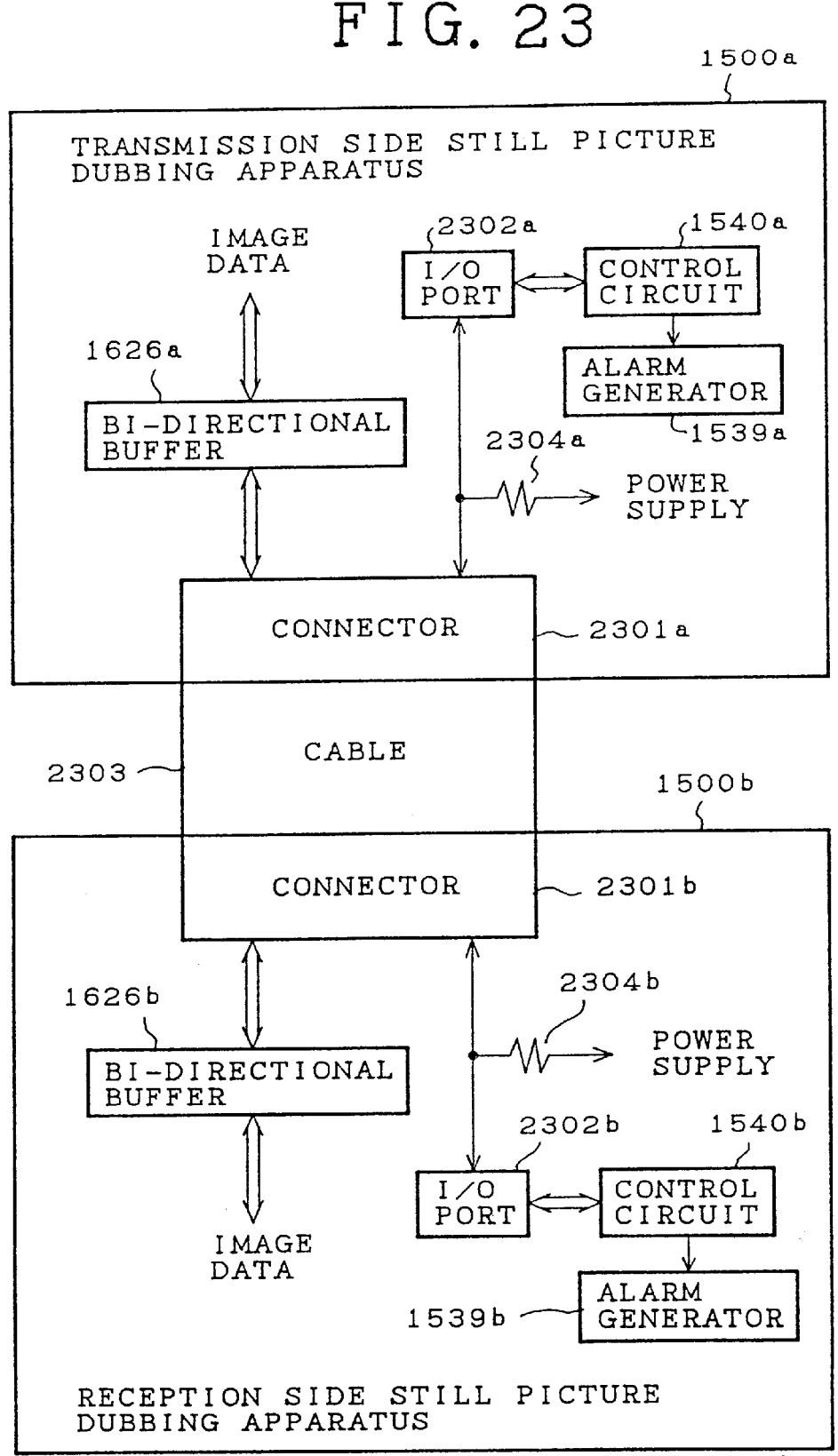
FIG. 23 is a block diagram showing a still picture dubbing apparatus according to a sixth embodiment of the invention.

FIG. 23 is a block diagram showing a still picture dubbing apparatus according to an embodiment of the present invention. In FIG. 23, numerals 2301a, 2301b designate connectors for image data transfer, and numerals 2302a, 2302b designate I/O ports for data input/output, controlled by control circuits 1540a, 1540b respectively and connected to the connectors 2301a, 2301b by one bit. Numeral 2303 designates a cable for transferring image data of transmission side and reception side, and numerals 2394a, 2304b designate pull-up resistors. In this embodiment, when the cable 2303 for image data transfer is not connected, an alarm is generated and the dubbing operation is stopped.

Figure 24:
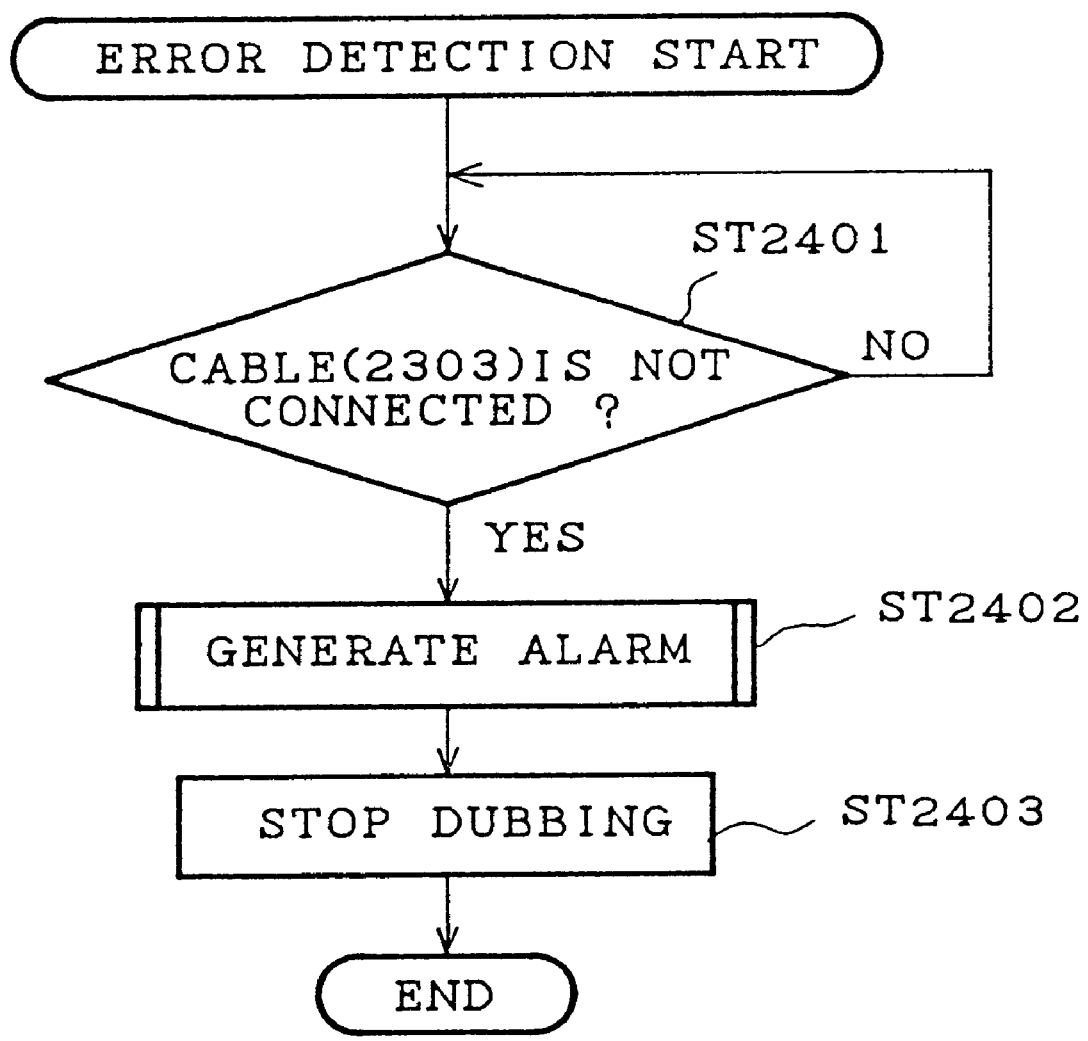
FIG. 24 is a flow chart explaining error detection operation during image data transfer operation of the embodiment shown in FIG. 23.

FIG. 24 is a flow chart explaining the procedure of error detection during image data transfer operation according to embodiment 9. Except for the dubbing operation state, the I/O ports 2302a, 2302b are made input state and at high level by the pull-up resistors 2304a, 2304b respectively. In the dubbing operation state, the I/O port 2302a is made output state only at transmission side and at low level. If the cable 2303 for image data transfer is connected, the I/O port 2302b at reception side must be at low level, and if this is still at high level, the cable 2303 is not connected. In following description, non-connection state of the cable 2303 is in error, but description of other error in general shall be omitted.

In FIG. 24, the reception side still picture dubbing apparatus 1500b supervises level of the I/O port 2302b by the control circuit 1540b, thereby no-connection state of the cable 2303 for image data transfer can be formed. That is, if the control circuit 1540b detects no connection (step ST2401), a command is issued to the alarm generator, and alarm by a buzzer is generated (step ST2402). At the same time, the control circuit 1540b stops the dubbing operation (step ST2403). Thus the user can recognize no connection of the cable.

As above described, according to embodiment 9, since an alarm is output in response to electrical no-connection state between transmission side and reception side, dubbing is stopped and erroneous recording can be prevented.

In embodiment 9, although alarm by voice is generated to no-connection state of the cable 2303 for image data transfer, the present invention is not limited to this, but message of alarm nay be displayed to the displayed to the display circuit or constitution of urging alarm to the user may be applied. Also combination of the embodiments 1 to 9 is, of course, possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still picture recording and reproducing apparatus for recording and reproducing still picture image data of a plurality of signal input types on a recording medium, said apparatus comprising:

recording and reproducing means for recording inputted first still picture data in a first assigned position on said recording medium, and for outputting second still picture image data recorded in a second assigned position;

a memory for storing the second still picture image data output by said recording and reproducing means;

means for assigning a first area on said recording medium to said recording and reproducing means, and for controlling said recording and reproducing means and said memory such that the first still picture image data recorded in the first area are stored in said memory;

means for assigning a second area on said recording medium to said recording and reproducing means, and for controlling said recording and reproducing means and said memory such that the second still picture image data stored in said memory are stored in the second area on said recording medium;

decision means for deciding whether a signal input type of third still picture data to be recorded on said recording medium by said recording and reproducing means matches a signal input type of the first still picture data and the second still picture data, wherein there is no correlation between block size and the signal input type of the first still picture data, the second still picture data and the third still picture data;

means for forbidding recording of the third still picture data by said recording and reproducing means when the signal input type of the third still picture data does not match the signal input type of the first still picture data and the second still picture data; and display means for displaying an error message when the signal input type of the third still picture data does not match the signal input type of the first still picture data and the second still picture data.

2. The still picture recording and reproducing apparatus of claim 1, wherein the plurality of signal input types include monochromatic signals, composite signals, and red-green-blue signals.

3. A still picture recording and reproducing apparatus for recording and reproducing still picture image data of a plurality of signal input types on a recording medium, said apparatus comprising:

recording and reproducing means for recording inputted first still image data in a first assigned position on said recording medium, and for outputting the second still picture image data recorded in a second assigned position;

a plurality of memories for storing the second still picture image data output by said recording and reproducing means;

means for assigning a first group of areas on said recording medium to said recording and reproducing means, and for controlling said recording and reproducing means and said plurality of memories such that still picture image data recorded in the first group of areas positions are stored in said plurality of memories respectively;

means for assigning a second area on said recording medium to said recording and reproducing means, and for controlling said plurality of memories such that still picture image data stored in an assigned memory among said plurality of memories are stored in the second area on said recording medium;

decision means for deciding whether a signal input type of third still picture data to be recorded on said recording medium by said recording and reproducing means matches a signal input type of the first still picture data and the second still picture data, wherein there is no correlation between block size and the signal input type of the first still picture data, the second still picture data and the third still picture data;

means for forbidding recording of the third still picture data by said recording and reproducing means when the signal input type of the third still picture data does not match the signal input type of the first still picture data and the second still picture data; and display means for displaying an error message when the signal input type of the third still picture data does not match the signal input type of the first still picture data and the second still picture data.

4. The still picture recording and reproducing apparatus of claim 3, wherein the plurality of signal input types include monochromatic signals, composite signals, and red-green-blue signals.

5. A still picture recording and reproducing apparatus for recording and reproducing still picture image signals of a plurality of signal input types on a recording medium, said apparatus comprising:

decision means for deciding whether a signal input type of still picture image signals to be recorded match a signal input type of still picture image signals already recorded on said recording medium, wherein there is no correlation between block size and the signal input type of the still picture image signal to be recorded and the still picture image signals already recorded;

means for forbidding recording of the still picture image signals to be recorded when the signal input type of the still picture image signals does not match the signal input type of the still picture image signals already recorded in said recording medium; and display means for displaying an error message when the signal input type of the third still picture data does not match the signal input type of the first still picture data and the second still picture data.

6. The still picture recording and reproducing apparatus of claim 5, wherein said decision means decides the signal input type, by detecting an input synchronous signal of image signals corresponding to the signal input type.

7. The still picture recording and reproducing apparatus of claim 5, wherein the plurality of signal input types include monochromatic signals, composite signals, and red-green-blue signals.

* * * * *